US012278726B2

United States Patent
Lewis

(10) Patent No.: US 12,278,726 B2
(45) Date of Patent: *Apr. 15, 2025

(54) DETECTING AND MITIGATING CASCADING ERRORS IN A NETWORK TO IMPROVE NETWORK RESILIENCE

(71) Applicant: CRITICALITY SCIENCES, INC., Alexandria, VA (US)

(72) Inventor: Theodore G. Lewis, Alexandria, VA (US)

(73) Assignee: CRITICALITY SCIENCES, INC., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,912

(22) Filed: May 15, 2024

(65) Prior Publication Data

US 2024/0305519 A1     Sep. 12, 2024

Related U.S. Application Data

(63) Continuation of application No. 17/658,927, filed on Apr. 12, 2022, now Pat. No. 12,021,680.

(60) Provisional application No. 63/173,679, filed on Apr. 12, 2021.

(51) Int. Cl.
*H04L 41/0654* (2022.01)
*H04L 41/14* (2022.01)
*H04L 41/147* (2022.01)

(52) U.S. Cl.
CPC ........ *H04L 41/0654* (2013.01); *H04L 41/145* (2013.01); *H04L 41/147* (2013.01)

(58) Field of Classification Search
None
See application file for complete search history.

(56) References Cited

U.S. PATENT DOCUMENTS

| | | | |
|---|---|---|---|
| 7,770,052 | B2 | 8/2010 | King et al. |
| 7,926,026 | B2 | 4/2011 | Klein et al. |
| 8,121,042 | B2 | 2/2012 | Wang et al. |
| 8,311,697 | B2 | 11/2012 | Rachlin |
| 8,472,328 | B2 | 6/2013 | Gopalan et al. |

(Continued)

FOREIGN PATENT DOCUMENTS

| | | |
|---|---|---|
| CN | 101662147 | 3/2010 |
| CN | 102819644 | 12/2012 |

(Continued)

OTHER PUBLICATIONS

Lewis, T.G., "The Many Faces of Resilience", Center for Homeland Defense and Security Naval Postraduate School, pp. 9.

(Continued)

*Primary Examiner* — Fadi Haj Said
(74) *Attorney, Agent, or Firm* — DLA Piper LLP (US)

(57) ABSTRACT

In an embodiment, a computer implemented method is provided. The method may include quantifying a plurality of component level risks for at least a subset of components in the network. The method may further include simulating cascades of the component level risks, with each corresponding component designated as a risk seed of the subset of components, throughout the network. The method may additionally include quantifying the network level risk as a risk status in a resilience spectrum based on the simulated cascades.

20 Claims, 26 Drawing Sheets

(56) References Cited

U.S. PATENT DOCUMENTS

| | | | |
|---|---|---|---|
| 8,660,024 B2 | 2/2014 | Lin et al. | |
| 8,660,025 B2 | 2/2014 | Lin et al. | |
| 8,665,731 B1 | 3/2014 | Ramesh et al. | |
| 8,688,420 B2 | 4/2014 | Dias de Assuncao et al. | |
| 8,804,490 B2 | 8/2014 | Tatipamula et al. | |
| 8,869,035 B2 | 10/2014 | Banerjee et al. | |
| 8,996,932 B2 | 3/2015 | Singh et al. | |
| 9,154,410 B2 | 10/2015 | Beheshti-Zavereh et al. | |
| 9,183,527 B1 | 11/2015 | Close et al. | |
| 9,185,027 B2 | 11/2015 | Beheshti-Zavereh et al. | |
| 9,331,930 B1* | 5/2016 | Ramasubramanian | H04L 41/12 |
| 9,417,950 B2 | 8/2016 | Friedlander et al. | |
| 9,558,056 B2 | 1/2017 | Sasturkar et al. | |
| 9,632,858 B2 | 4/2017 | Sasturkar et al. | |
| 9,729,386 B2 | 8/2017 | Kiesekamp et al. | |
| 10,095,813 B2 | 10/2018 | Ramesh et al. | |
| 10,303,540 B2 | 5/2019 | Friedlander et al. | |
| 10,454,753 B2 | 10/2019 | Sasturkar et al. | |
| 10,539,955 B2 | 1/2020 | Petri et al. | |
| 2003/0033542 A1* | 2/2003 | Goseva-Popstojanova | H04L 63/1441 726/23 |
| 2007/0016955 A1* | 1/2007 | Goldberg | G06Q 40/08 713/188 |
| 2007/0091796 A1* | 4/2007 | Filsfils | H04L 45/28 370/228 |
| 2011/0283145 A1* | 11/2011 | Nemecek | G06F 11/008 714/37 |
| 2013/0232094 A1* | 9/2013 | Anderson | G05B 23/0281 706/12 |
| 2013/0343228 A1* | 12/2013 | Cohen | H04L 45/48 370/256 |
| 2015/0195190 A1* | 7/2015 | Shah Heydari | H04L 45/22 714/47.3 |
| 2015/0381649 A1* | 12/2015 | Schultz | G06Q 10/0635 726/25 |
| 2017/0213037 A1* | 7/2017 | Toledano | H04L 63/06 |
| 2018/0285797 A1* | 10/2018 | Hu | G06Q 10/0635 |
| 2019/0235945 A1 | 8/2019 | Friedlander et al. | |
| 2019/0245879 A1* | 8/2019 | Ward | H04L 63/0236 |
| 2021/0028977 A1* | 1/2021 | Ortenberg | H04L 67/10 |
| 2021/0392529 A1* | 12/2021 | Spanias | H04W 24/08 |
| 2022/0239564 A1* | 7/2022 | Jiang | G06N 7/01 |

FOREIGN PATENT DOCUMENTS

| | | |
|---|---|---|
| CN | 103050971 | 4/2013 |
| CN | 103151774 | 6/2013 |
| CN | 103488873 | 1/2014 |
| CN | 103514079 | 1/2014 |
| CN | 103605560 | 2/2014 |
| CN | 103972880 | 8/2014 |
| CN | 104298593 | 1/2015 |
| CN | 104335161 | 2/2015 |
| CN | 104376506 | 2/2015 |
| CN | 104901306 | 9/2015 |
| CN | 105183957 | 12/2015 |
| CN | 105391064 | 3/2016 |
| CN | 106327034 | 1/2017 |
| CN | 106503923 | 3/2017 |
| CN | 106548265 | 3/2017 |
| CN | 107066666 | 8/2017 |
| CN | 107067127 | 8/2017 |
| CN | 107231255 | 10/2017 |
| EP | 1857941 | 11/2007 |
| EP | 1898554 | 3/2008 |
| EP | 2552065 | 1/2013 |
| EP | 2674826 | 12/2013 |
| EP | 2737671 | 6/2014 |
| EP | 2737672 | 3/2019 |
| WO | WO20042307 | 3/2020 |
| WO | WO20083091 | 4/2020 |

OTHER PUBLICATIONS

Criticality Sciences, "Introduction to Criticality Sciences", pp. 1, (Mar. 2022).
Criticality Sciences, "Reilience to High Consequence Cascading Failures in Infrastructure Sytems", pp. 1, (Jan. 2022).
Lewis, T.G., "Defending a Networked Nation", Critical Infrastructure Protection in Homeland Security, pp. 72, (2020).
English Abstract of CN103151774 published Jun. 12, 2013.
English Abstract of CN105391064 published Mar. 9, 2016.
English Abstract of CN105183957 published Dec. 23, 2015.
English Abstract of CN103514079 published Jan. 15, 2014.
English Abstract of CN103605560 published Feb. 26, 2014.
English Abstract of CN104335161 published Feb. 4, 2015.
English Abstract of CN1106548265 published Mar. 29, 2017. . . .
English Abstract of CN107066666 published Aug. 18, 2017.
English Abstract of CN101662147 published Mar. 3, 2010.
English Abstract of CN102819644 published Dec. 12, 2012.
English Abstract of CN104901306 published Jan. 11, 2017.
English Abstract of CN104376506 published Feb. 25, 2015.
English Abstract of CN104298593 published Jan. 21, 2015.
English Abstract of CN103972880 published Aug. 6, 2014.
English Abstract of CN103488873 published Jan. 1, 2014.
English Abstract of CN103050971 published Apr. 17, 2013.
English Abstract of CN107067127 published Aug. 18, 2018.
English Abstract of CN106548265 published Mar. 29, 2017.

\* cited by examiner

130

132 — Inputs
- Node #: Station 4
- Name tag: Station 4    Sector/Layer: None
- [T Helper] Threat 1.0
- [V Helper] Vulnerability 0.1
- [C Helper] Consequences 100.0
- [E Helper] Elimination $ 50.0
- [I Helper] Investment $ 0.0
- [I Helper] ******* *$ 2.94
- Repair Order [0]  Repair Cost [0.0]  Repair Time [0.0]

○ Blocking?  ○ Disabled?

134 — Outputs
- Degree 0
- Optimal T 1.0
- Optimal V 0.0
- Risk 0.0
- Bottleneck 1.0    Link -1 1.0
- Impacting node # T8D
- Overload 0.85
- Cascade Frequency 0.0
- Influence 3.35

[Cancel] [Ok]

*FIG. 1C*

| Name[#] | Sector | Connectivity | Node Overload | Net Flow Loss | Influence | ****** | ****** | Reduced Waterability | Cascade | Risk |
|---|---|---|---|---|---|---|---|---|---|---|
| Low Service Junction[10] | Water | 6 | 0.58 | 0.0 | 3.358 | 1.0 | 0.0 | 0.1 | 1.0 | 10.0 |
| 1-High Service[5] | Water | 5 | 1.0 | 102.08 | 2.039 | 1.0 | 0.0 | 0.1 | 0.104 | 10.0 |
| 2-High Service[1] | Water | 4 | 1.0 | 101.73 | 1.854 | 0.833 | 0.0 | 0.1 | 0.824 | 10.0 |
| Pump B[12] | Water | 4 | 0.83 | 0.0 | 2.71 | 1.0 | 0.0 | 0.1 | 0.796 | 10.0 |
| Reservoir S[6] | Water | 1 | 0.36 | 2.84 | 0.518 | 0.333 | 0.0 | 0.1 | 0.755 | 10.0 |
| High Service A[15] | Water | 2 | 1.0 | 200.0 | 0.540 | 0.333 | 0.0 | 0.1 | 0.753 | 20.0 |
| Pump A[13] | Water | 4 | 2.11 | 0.0 | 1.793 | 1.0 | 0.0 | 0.1 | 0.719 | 10.0 |
| ATC[2] | Water | 1 | 1.0 | 101.73 | 0.551 | 0.833 | 0.0 | 0.1 | 0.712 | 10.0 |
| BuldingAirport[7] | Water | 1 | 1.0 | 102.00 | 0.518 | 1.0 | 0.0 | 0.1 | 0.712 | 10.0 |
| Reservoir A[2] | Water | 1 | 0.56 | 2.95 | 0.551 | 0.146 | 0.0 | 0.1 | 0.673 | 10.0 |
| Elevalved Tanks A[17] | Water | 1 | 2.11 | 0.0 | 0.536 | 1.0 | 0.0 | 0.1 | 0.663 | 10.0 |
| Low Service A[14] | Water | 2 | 0.14 | 0.0 | 1.536 | 1.0 | 0.0 | 0.1 | 0.666 | 10.0 |
| Wells M[11] | Water | 2 | 0.58 | 3.06 | 1.81 | 1.0 | 0.0 | 0.1 | 0.662 | 10.0 |
| ********* Res[5] | Water | 1 | 0.36 | 2.84 | 0.418 | 1.0 | 0.0 | 0.1 | 0.655 | 10.0 |
| Wells 0[4] | Water | 1 | 0.86 | 3.1 | 0.713 | 0.166 | 0.0 | 0.1 | 0.646 | 10.0 |
| Reservoir [**] | Water | 1 | 0.16 | 2.92 | 0.999 | 1.0 | 0.0 | 0.1 | 0.634 | 10.0 |
| Pump 0[j] | Water | 4 | 0.86 | 3.12 | 2.381 | 0.156 | 0.0 | 0.1 | 0.632 | 10.0 |
| Reservoir F#1-#2[16] | Water | 1 | 2.0 | 3.99 | 0.175 | 0.156 | 0.0 | 0.1 | 0.547 | 10.0 |

DETECTING AND MITIGATING CASCADING ERRORS IN A NETWORK TO IMPROVE NETWORK RESILIENCE

CROSS-REFERENCE

This application is a continuation of U.S. application Ser. No. 17/658,927, filed on Apr. 12, 2022, which claims priority to and the benefit of U.S. Provisional Application No. 63/173,679, filed on Apr. 12, 2021, which is hereby incorporated by reference for all purposes as if set forth herein.

FIELD

This disclosure relates to network risk analysis and mitigation measures for making the network more resilient against the risk of cascading failures.

BACKGROUND

A network is an interdependent, complex collection of nodes. Both the interdependence and the complexity inherently make a network failure prone—the interdependence causes an error condition to cascade from the originating node to other connected nodes; the complexity provides multiple, difficult to isolate pathways for cascading error conditions. Therefore, a randomly occurring or a maliciously caused error condition in a single node can quickly propagate throughout the network and bring the entire network down, or a large portion thereof, in short order. A resilient network is less prone to cascading errors (or faults): a resilient network limits (or contains) failure and its consequences and further keeps failures local and small.

Conventional methods of reducing network faults and improving network resilience have been unsatisfactory. These methods are generally reactive (post hoc), ad hoc, and manual. For instance, a fault is detected, the cause of the fault is manually analyzed, and the fault may be remedied reactively in an ad hoc manner just to address the fault without a holistic view of the network. Therefore, conventional methods are not scalable to large networks with many and diverse set of components. Conventional methods further are not effective for interdependent networks of networks because specific causes of failures between two different network types is poorly understood. Additionally, conventional methods focus on prevention of component failure—but fail to facilitate designing of networks that are resilient after the component fails.

Conventional methods are also not practical. Many types of failures are unique "Black Swans" that do not repeat frequently. A reactive system that relies heavily on analyzing failure patterns therefore will not have enough failure data to learn and discern failure patterns. As a corollary, conventional methods fail to anticipate failures that could occur, but have never been observed to occur. These types of failures are specifically targeted for exploitations by intelligent adversaries to attack the network.

As such, a significant improvement upon network error mitigation and resilience improvement is therefore desired.

SUMMARY

Embodiments described herein solve the aforementioned problems and may provide other solutions as well. The disclosed principles comprise a practical system and method of scientifically addressing network resilience, especially but not exclusively for the purpose of mitigating maximal and standard ongoing risks to infrastructure caused by a cascading failure (also referred to as risks or errors) in network structure or flow output. An example embodiment determines, prioritizes and presents ameliorative interventions in a network's risk and resilience relative to losses that can be projected due to cascading events. The disclosed principles utilize integrated measures of cascade resilience, in relation to structure, flow, and to recovery, quantitatively and precisely linking each aspect of resilience to the risk posed to the system by such cascading failure(s). The disclosed principles are applicable to all networked infrastructures, including, for example, water systems, power grids, power generation and pipelines, telecommunications and financial networks, the internet, transportation networks, and supply chains; to operating networks in conjunction with their extended technological and human control and information networks, for example with SCADA (supervisory control and data acquisition) and community emergency managers; to operating networks with their dependent and interdependent infrastructure networks, such as a combined water-electricity systems and natural gas and renewable energy systems-electricity grid systems; and to networked organizations, for example ports, communities and homes, as well as (especially) to multiple interconnected networks comprised of these types.

In an embodiment, a computer implemented method is provided. The method may include quantifying a plurality of component level risks for at least a subset of components in the network. The method may further include simulating cascades of the component level risks, with each corresponding component designated as a risk seed of the subset of components, throughout the network. The method may additionally include quantifying the network level risk as a risk status in a resilience spectrum based on the simulated cascades.

BRIEF DESCRIPTION OF DRAWINGS

FIGS. 1B-1D show example interfaces generated by client devices and or an analytic server of the computing environment of FIG. 1A, based on the principles disclosed herein.

The figures are for purposes of illustrating example embodiments, but it is understood that the present disclosure is not limited to the arrangements and instrumentality shown in the drawings. In the figures, identical reference numbers identify at least generally similar elements.

DESCRIPTION

Figure 1A:
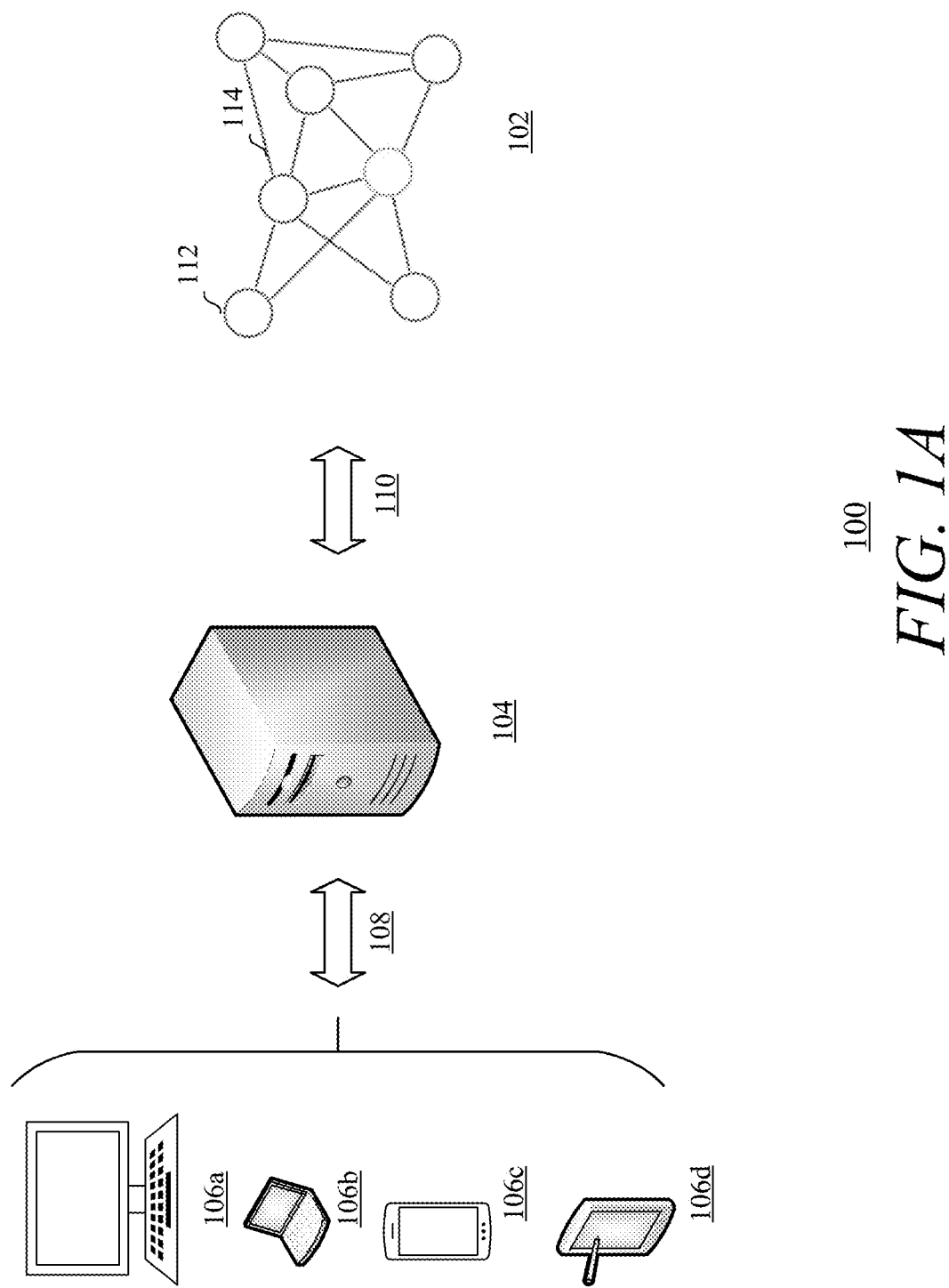
FIG. 1A shows an example computing environment based on the principles disclosed herein.

Example definitions of the terms used herein are provided below. It should be understood that the definitions are just for the ease of understanding of the disclosed principles and should not be considered limiting.

A "network" is a collection of a system's component nodes and links and a wiring diagram or database representation of their connections that shows topology. The disclosure treats networks as complex adaptive systems subject to unexpected consequences. Some example networks include water distribution networks, pump driven stormwater and wastewater networks, electrical power distribution networks, electrical transmission networks, supervisory control and data acquisition (SCADA) systems, telecommunication networks, transportation networks, computer networks, building structures, socio-technical networks, supply chain networks, internet of things (IoT) networks, human managerial networks, and or any other type of network.

The term "network" can mean a single network, or a set of multiple functionally distinct interconnected networks. An example of the fundamentally distinct interconnect networks includes a water distribution network (a first type of network) connected to an electrical power distribution network (a second type of network). The first type and the second type of network may be maintained by the same entity.

An "interconnected" set of multiple networks comprises the connected topology of two or more functionally distinct and qualitatively differentiated networks; and for this disclosure's function and novelty, those interconnected networks may be of different types, conveying different types of flow or function, e.g., electrical power vs. information vs. traffic vs. water.

A "cascade" or "cascading failure" is a sequence of failures of networked components where the second and subsequent component failures are triggered by the prior failure of another interrelated network component rather than an external threat or random failure impacting the second and subsequent components originally.

"All hazard" means that the mechanics of the failure—especially a cascading failure—are independent from the original cause of the initiation of the failure, e.g., once a cascading failure is initiated for whatever reason (random or threat-driven), its mechanics proceed similarly regardless of that originating reason. There may be, in some instances, a correlation between the original cause and changes in the mechanics of cascading failure. As an example, a forest fire taking down a power station may cause hotter power lines that may cascade failures more readily.

"Criticality factors" are quantified measures of a network's attributes that correlate to its risk and resilience with respect to cascading failure. They may relate to risk of threat, risk of random failure, to risk as influenced by the network's topology, or to network flow and function, among other characteristics. Criticality factors may also include social, managerial, organizational, and or human factors as well. Some criticality factors used in the disclosure include vulnerability (such as robustness or age), connectivity (number of connections a node has), congestion (maximum length of packet queue in a flow), flow overload versus a rated component flow capacity, betweenness (number of shortest paths through a component from/to all other components), influence (spectral radius), cascade frequency (fraction of failure events in which a component propagates a cascading failure), and blocking node/link (an element whose removal segments the network into islands).

"Weight" is a normalized component criticality factor.

"Risk" is in any units of consequence (e.g. dollars or lives), and can take on many measures; in this case specific risk metrics include "static risk" which is the sum over all network components of the weighted threat probability, vulnerability probability, and consequence (e.g. R=TVC, see Model Based Risk Assessment for Critical Infrastructures, WIT Transactions on State of the Art in Science and Engineering, Vol. 54, © 2012 WIT Press, www.witpress.com, ISSN 1755-8336 (online)), and also various probable loss statistics that summarize a mode or attribute of the consequence distribution (e.g., maximum probable loss, mean loss, or maximum loss). The disclosed embodiments may further determine system recovery cost. The disclosed embodiments also link TVC risk to network resilience.

The "consequence distribution" is the probability distribution of loss, cost, and or consequence resulting from a wide range of cascading failure events on the network. For example, consequences might include direct and/or indirect losses, public and or private losses, insured losses, cost of recovery, recovery time, financial losses, losses in lives, losses in reputation, system recovery cost, network recovery cost, system recovery time, network recovery time, and or other consequences. In some instances, the consequence distribution may be the probability distribution for all possible cascading failure events (or all possible event initiations). This type of consequence distribution may be a feasible way of estimating the consequence distribution of all possible events. The consequence distribution is the primary means of measuring risk in this disclosure.

"Recovery order" is an aspect of resilience that pertains to cascading failures, because in an interdependent network dependent components must be recovered after those components they depend on. This disclosure also quantitatively integrates the cost of recovery time with two other aspects of resilience (risk from a lack of structural and flow resilience), adding quantitative specificity to the concept and denominating its effects in units of risk.

"Recovery time" is the time it takes to recover part or all of the network's function after a cascade failure, given the components that failed and the availability and speed of operation of recovery assets. Each component has a recovery time, which may be contingent on appropriate and or available recovery resources.

"Recovery cost" is the cost of repairing a component after failure and is an aspect of the consequence of the failure. Normally recovery cost is borne by the network operator, rather than by society. It should be understood that recovery cost is not a function of downtime (e.g., for repairs). The consequences (described above), however, are a cumulative function of downtime.

"Maximum Probable Loss" (MPL) describes expected loss due to cascading failures, and is the maximum value of the consequence exceedance probability multiplied by the expected consequence computed from the consequence distribution. MPL is one of many summary statistics of the consequence distribution, but it is novel and particularly useful for assessing the risk of cascading failures.

"Stress tests" are computer automated processes subjecting nodes and links to simulated events to determine their resilience, such as initiating a threat-specific or random failure of one or more components on the network, re-routing around a missing node or link to determine overloading of a node or link in a directed flow network, or propagation of a cascading failure.

"Resilience" encompasses at least three definitional types of cascade metrics and their visualizations: "structural resilience" which exists for all kinds of networks and precisely and quantitatively links risk metrics with vulnerability metrics and with network topology to calculate a network resilience score according to the fundamental resilience equation $\log(q)=b-ky$ relating resilience, vulnerability, and the consequence distribution; "flow resilience" which quantitatively relates flow overload ratios to consequence distributions and which exists for networks that functionally convey flows and for which flow overloading of a component beyond its rated capacity is a mechanism for cascading failure, providing a computable framework linking flow resilience to risk; and "recovery resilience" which quantifies the recovery cost, consequences, and recovery time of a failure given an assumed set of recovery assets working in parallel, precisely linking recovery to network flow and structural resilience.

"Elimination costs" are what it costs in economic terms to reduce a component's vulnerability or probability of cascading failure to a value of zero.

"Investment budget" is the amount of money available to invest in resilience improvements, which can be allocated in fractions to improve resilience by rewiring the network topology or reducing component vulnerability.

"Optimization" or "optimal allocation" refers to one or more levels of prioritization of mitigation interventions to improve resilience based on the efficacy of an intervention or its cost-effectiveness in reducing risk affordably or within a pre-set budget or obeying the constraint of positive return on investment for reduced risk in return for mitigation investment.

"Rewiring" or "restructuring" refers to altering network topology, e.g., by splitting or combining links or nodes, adding or removing links, adding or removing redundancy, and/or adding or removing islands, shortcuts, interceptors, zones, protection, breakers, valves, switches, compartmentalization, airgaps, backups, or microgrids in the network.

The "tipping point" separates fragile networks (or set of multiple functionally distinct interconnected networks) that are inherently vulnerable to cascading failure from networks that are inherently resilient to cascading failure. The tipping point as expressed on the structural resilience scales is an effective vulnerability value where the system's status will typically flip from a positive resilience score q to a negative resilience score q.

The "resilience reserve" is a type of buffer or factor of safety in structural resilience scales separating the network's resilience status from the tipping point; this is a type of resilience buffer which allows network vulnerability and resilience to be exploited or compromised or degraded, or allows for error in the calculation of the status or tipping point, without making high consequence cascading failure likely on the network. The resilience reserve could be used for example as a basis for engineering safety and reliability calculations and standards setting.

A "fragile" network is a network with a status too close to, or beyond, the resilience tipping point; networks are either fragile or resilient with respect to cascading failure.

A "digital twin" is a model of a network that simulates its structure and function, possibly in dynamic fashion, and which may incorporate or assimilate updated information on the network's status to represent the network's current state or to predict the network's future state (e.g., from database updates or realtime SCADA and sensor systems). Resilience and recovery calculations are run against the digital twin and the database from which the digital twin is constructed. An up-to-date digital twin in combination with sufficient computing power and sufficiently fast computing methods allows failure-specific recovery order calculations to be run in time to assist with recovery operations.

Embodiments disclosed herein present systems and methods for a calculation of risk, resilience, and critical assets components; (nodes and links) in one or more critical infrastructure systems represented as a network or system of networks. The systems and methods are also applicable (e.g., feasible) for large, complex, and interdependent networks. A network contains n nodes and m links, connected according to a topology defined by connection matrix C. Disclosed herein is a novel use of the mathematical property of matrix C, in particular the spectral radius r, which represents an important indicator of a component's contribution to the network's risk with respect to cascading failure. Spectral radius is just but an example and other criticality factors described throughout this disclosure may be used to determine the component's contribution to the risk. Infrastructure systems represented as a network are fragile due to the vulnerability of individual components to failure (nodes and links) and to network fragility with respect to individual component failures triggering dramatically more consequential cascading failures. The spectral radius is mathematically linked to network fragility. Therefore, the embodiments disclosed herein are feasible and efficient systems and methods of estimating the consequence distribution based on the one or more criticality factors.

Mathematical terms are defined in Table 1a and equations are defined in Table 1b.

TABLE 1a

| Symbol | Meaning |
| --- | --- |
| n | Number of nodes in a network |
| m | Number of links in a network |
| C | Connection matrix of an n × n network |
| λ | Eigenvalues of the connection matrix |
| r | Spectral radius of network; largest eigenvalue of its connection matrix |
| v | Network-wide vulnerability of nodes and links: $0 \leq v \leq 1$ |
| $v_0$ | Tipping point vulnerability: a measure of resilience |
| Connectivity, g | Number of links connecting a node to other nodes |
| Bottleneck, b | Number of paths through node x from every node, to every other node |
| Overload, fR | Ratio of Flow to capacity of node/link |
| Cascade Frequency | Normalized frequency of cascading in simulation |
| Influence | Eigenvalue of node |
| Age V | Forecasted future v after t time units of aging |
| Sharpen V | Enhanced contrast by Markov clustering applied to v |
| Robustness s | A measure of network asset tolerance to faults |
| B, L | Set of blocking nodes, links: removal of a blocking node/link segments the network into islands |
| T | Threat probability of node/link: $0 \leq T \leq 1$ |
| V | Vulnerability probability of node/link: $0 \leq V \leq 1$ |
| V(0) | Vulnerability input by user |
| C | Consequence of node/link. |
| E | Cost to reduce node/link vulnerability to a minimum |
| I | Financial investment to reduce node/link vulnerability |
| PRA | Probabilistic Risk Analysis |
| R | Simple PRA Risk = TVC |
| q | Fractal dimension: slope of EP(x) vs. x via simulated cascades; x is loss |
| q(y) | Flow resilience: fractal dimension of Log(MPL) vs. cutoff |
| b, k | Intercept and slope of log(q) vs. v graph, alternatively log(q) vs. vr. |
| Pr(x) | Probability of a failure due to loss x |
| EP(x) | Exceedence probability vs. loss x |
| MPL(x) | Maximum Probable loss: EP(x) * x |
| Seed | The node where a failure initiates, causing a cascade |
| nFaults | Number of cascading nodes or links |
| U | Number of repair units input by user |
| mu | Mean time to repair one fault; sampled from an exponential or input by user |
| Recovery cost | Cost to recover from nFaults |
| Recovery time | Average time to recover |
| Repair time | Average time to repair one fault |
| Repair order | Priority of asset repairs based on dependency (directed links) |
| Cascade | Fault propagation via adjacent links or nodes |
| N-k flow cascade | Fault propagation by overloading links |
| N-k flow Z | Fractal dimension of maximum MPL vs. Cutoff Value curve |
| Y = Sigmoid(x) | Y = 0; x < 1. Y = x; x < Cutoff; Y = 1; x ≥ Cutoff |
| Cutoff | Value of x where sigmoid(x) = 1.0. |
| p | Number of processing cores in a parallel (cloud) computer |

TABLE 1a-continued

| Symbol | Meaning |
| --- | --- |
| Power method | Mathematical method of computing eigenvector of connection matrix using repeated matrix multiplication instead of matrix inversion |
| exponential diminishing returns | $V = V(0)\exp(-aI)$; a is a constant for each node and link; V(0) is given by input. |

TABLE 1b

| Equation | Explanation |
| --- | --- |
| R = TVC | Asset PRA risk is the product of WTVC |
| $R_{net} = \Sigma_i TVC_i$ | Network PRA risk is the sum of asset risks across nodes and links |
| $x = \Sigma_{i-failed} TVC_i$ | Expected loss over failed assets, only |
| Normalized x/x_max | X as a percentage of expected loss; x/Maximum Loss |
| Pr(x) | Histogram of cascade failures of size normalized x |
| $EP(x_j) = Pr(x \geq x_j)$ | Histogram of exceedence probability |
| Log(q) = b − kv; or Log(q) = b − (kr)v | Resilience equation relating v and fractal dimension, or product of fractal dimension and spectral radius. |
| $v_0 = b/k$; or $v_0 = b/(kr)$ | Tipping point $v_0$ occurs when log(q) = 0. |
| $Z = 5(1 + v_0 − s]$ s = [b − Log(q)]/k | Resilience on a scale of 0 to 10 when b, q, and k are found by simulation |
| N − k flow Z = q(y) | Slope of maximum log(MPL) vs. log(y) = log(cutoff value) |
| mu $e^{-mux}$ | Exponential distribution of repair times with mean of mu |
| MPL(x) = xEP(x), or MPL(x) = $x^{(1-q)}$ | Maximum Probable loss in terms of exceedence, or MPL in terms of least-squares fit to power law with exponent (1 − q) |
| V = V(0)exp(−aI) | Diminishing returns equation for buying down vulnerability. |
| a = −log(Vmin/V(0))/E | |

The methods disclosed herein generally find the most critical components (nodes and links) of a network, which contribute the most to network resilience or fragility when they are protected or made more vulnerable. Risk with respect to cascading failure is defined by a combination of mathematical analysis, simulation, and stress testing. The principal measures of network resilience are the static risk, consequence distribution (and derived MPL and summary statistics), recovery time and cost, structural resilience score, and flow resilience score. The principal criticality factors that correlate to network resilience include, but are not limited to, structural radius of a component, connectivity of a component, overload ratio of a component, bottlenecks, blocking nodes, and cascade frequency of a component. The three levels of service, based on three levels of input data available the corresponding sets of outputs possible, are summarized in Table dc below.

TABLE 1c

| Level of service | Inputs (cumulative) | Risk & Resilience Outputs (cumulative) |
| --- | --- | --- |
| BASELINE NETWORK STATISTICS | Node and Link topology and flow | Basic network summary statistics |
| L1: TECHNICALLY OPTIMAL MITIGATION PRIORITIES | T, V, C<br>Number of repair units<br>Repair time per component<br>Relative cascade vulnerability of components.<br>Component age or other proxies for vulnerability | Static TVC Risk (traditional risk)<br>Dynamic risk and consequence statistics for cascading failures (e.g., MPL, max, mean of consequence distribution)<br>Structural Resilience<br>Flow Resilience<br>Recovery time<br>Criticality Factors; most critical components prioritized for mitigation<br>Technical prioritization of mitigation and rewiring of components and topology, to mitigate tipping point fragility, minimize static and dynamic risk, and maximize resilience metrics<br>Optionally, threat-specific "T" scenarios |
| L2: FISCALLY OPTIMAL MITIGATION PRIORITIES | Vulnerability elimination or mitigation cost for components<br>Restructuring/Rewiring costs<br>Mitigation Budget<br>Actual cascade vulnerability of components, or basis for calibration to estimate it | Most cost-effective combination of mitigation interventions that meets the budget and/or that mitigates tipping point fragility<br>Comparison of cost effectiveness of component hardening/armoring to reduce vulnerability versus rewiring (splitting, merging, islanding, etc.) and versus adding recovery assets. |
| L3: OPTIMAL-ROI MITIGATION BUDGET, TIMING, AND SCOPE | Time value of money<br>Master plans | Mitigation intervention priorities, budget, and timing of intervention that maximizes the Return on Resilience Investment with respect to reducing risk. |

The disclosed principles may be implemented as computer software and applied to real world critical infrastructure systems. These calculations and simulations impose a geometrically large burden on modern computer equipment for infrastructure networks of realistic size. For example, a network model of the core AS-level Internet can easily contain n=50,000 nodes and m=450,000 links. Thus, there is a general need for fast algorithms to compute fractal dimension q, spectral radius r and parameters b and k in the fundamental resilience equation, and to identify the set of highly critical blocking assets B and L.

FIG. 1A shows an example computing environment 100 based on the principles disclosed herein. As shown, the example environment 100 may comprise a network 102, an analytic server 104, and client computing devices 106a-106d (collectively referred to as client computing devices 106 and commonly referred to as a client computing device 106). The analytic server 104 may be connected to the network 102 using a communication channel 110. The client devices 106 may be connected to the analytic server 104 through the communication channel 108. It should, however, be understood that the components of the computing environment 100 and the communication channels therein between are merely examples, and environments with additional, alternative, and fewer number of components should be considered within the scope of this disclosure.

The network 102 may include any type of network, including but not limited to, a computer network, a communication network, a power distribution network, a transport network, a water distribution network, and or any other types of networks. Structurally, the network 102 may comprise multiple nodes (an example node labeled as 112) and interconnections between the nodes (an example interconnection labeled as 114). Depending upon the type of network, the nodes may provide functionality to change the state of the network (or a portion thereof) and the interconnections may propagate the change to other nodes. For example, in a computer network, each node may provide a form of computation and the interconnections may be used to propagate the results of the computation. As another example, a node in a water distribution network may provide a motive power (e.g., through a pump) and the interconnections may be water pipes that may distribute water using the motive power. As yet another example, in a transport network, the node may provide ingress/egress points for passengers (e.g., a station) and the interconnections may provide travel linkage for passengers between different ingress/egress points. It should however be understood that these are just but a few examples of types of networks 102, and any type of network in accordance with the disclosed principles should be considered within the scope of this disclosure.

The analytic sever 104 may include any kind of computing device that interfaces the network 102 to receive information therefrom and provide instructions thereto. The information received by the analytic server 104 from the network 102 may include error conditions, the state of nodes, the state of the interconnections, and or any other type of information associated with the security of the network 102. The analytic sever 104 may include computer program instructions to analyze the received information, often in conjunction with instructions received from the client devices 106, to detect network failure risks and generate instructions to mitigate the detected risks as described herein. The communication channel 110, interconnecting the network 102 and the analytic server 104, may be any type of communication technology including a packet switching network (e.g., IP-based communication) and or a circuit switching network (e.g., cellular telephony).

For example, the communication channel 110 may include a local area network (LAN), metropolitan area network (MAN), wide area network (WAN) such as the Internet, and or any other type of network.

It should be understood that the analytic server 104 is just a moniker and any type of computing device performing the corresponding operations should be considered within the scope of this disclosure. For example, the analytic server 104 may include a server computing device, a desktop computing device, a laptop computing device, a tablet computing device, and or a mobile computing device. The functionality of the analytic server 104 may be distributed to different components in a cloud environment—therefore, the reading of the analytic server 104 should not be confined to a single device.

The client devices 106 may include any kind of computing devices that may interface the analytic server 104. For example, the client devices 106 may include a desktop computing device 106a, a laptop computing device 106b, a mobile computing device (e.g., a smartphone) 106c, a tablet computing device 106d, and or any other type of computing device. The client device 106 may be carried by a system administration to monitor the network 102 through the analytic server 104 and execute mitigatory actions against failures of the network 102. To that end, the client device 106 may provide interfaces—textual and or graphical—for the system administrator for the monitoring and mitigation functionality. The communication channel 112 may enable communications between the client device 106 and the analytic server 104. The communication channel 112 may be similar to communication channel 110, and similarly include packet switching and or circuit switching networks.

In some embodiments, the analytic server 104 may provide the functionality of the client devices 106. That is, a terminal of the analytic server 104 itself may allow a system administrator to monitor the network 102 and mitigate its failures. For example, the terminal may provide the interfaces for the system administrator, and he/she may not have to carry a separate client device 106.

Figure 1B:
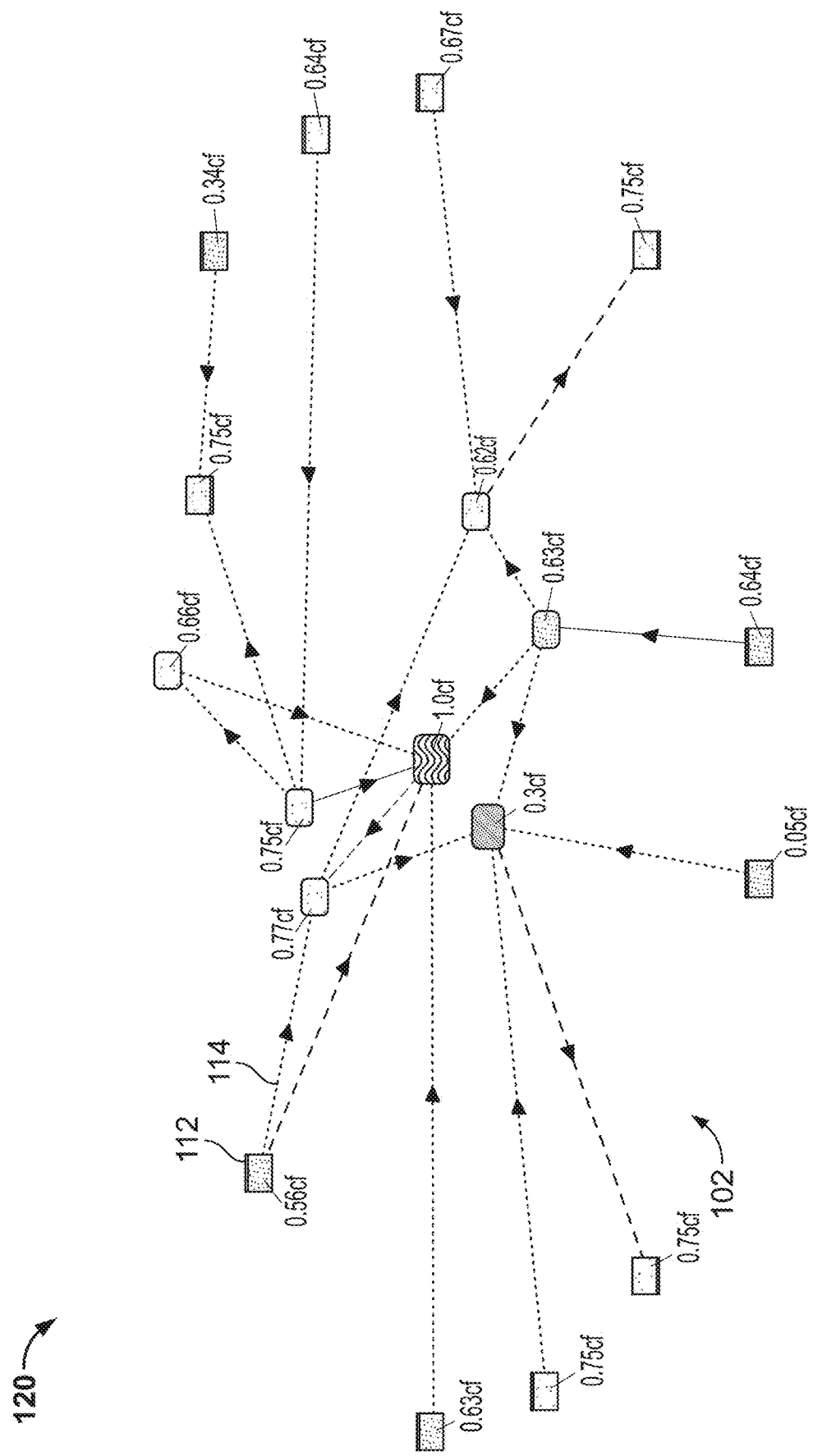

FIG. 1B shows an example interface 120 generated by the client devices 106 and or the analytic server 104, based on the principles disclosed herein. The interface 120 may show the structure of the network 102 being monitored. For example, interface 120 shows several nodes (e.g., node 112) and interconnections (e.g., interconnection 114) of the network 102. FIG. 1C shows an example interface 130 generated by the client devices 106 and or the analytic server 104, based on the principles disclosed herein. In particularly, the example interface 130 shows an input portion 132 and an output portion 134. The input portion 132 may allow the user to view and or input various desired network parameters and the output portion 134 may output the actual parameters of the network. FIG. 1D shows another example interface 140 generated by the client devices 106 and or the analytic server 104, based on the principles disclosed herein. The example interface 140 may show node network properties, examples of which are illustrated in FIG. 1D.

The principles disclosed herein may be applied to a critical infrastructure network such as a pipeline network, telecommunications network, water system, transportation system, Internet, supply chain, etc. As shown in the interface 130 of FIG. 1C, there may be inputs (shown in the input portion 132) to the network and outputs (shown in the output portion 134) from the network. The component-level inputs to the method disclosed herein include risk elements, threat T, vulnerability V, and consequence C. Additional inputs may be added to the disclosed model to enhance its utility and accuracy, such as repair cost and time, the cost to reduce vulnerability, called elimination cost E, and an investment budget B to apply toward risk reduction. Budget B is optimally allocated in parcels of varying size I, to reduce vulnerability. This is called resource allocation and reduces risk by reducing asset vulnerability. One can invest I in a variety of preventive or deterrence measures to reduce vulnerability, access, awareness, etc. The model incorporates quantitative measures of static risk, MPL risk, optimal risk reduction, resilience analysis, and various simulation algorithms for computing expected losses due to cascade failures and/or removal of assets. The disclosed principles combine network science, risk and resilience analysis, resource optimization, stress testing of assets, and restructuring algorithms for improving resilience and reducing risk as relates to cascade failures. After the method is completed, component-level outputs generated (shown in the output portion 134) include criticality factors like bottleneck, overload ratio, cascade frequency, or influence, along with optimized V.

Figure 2:
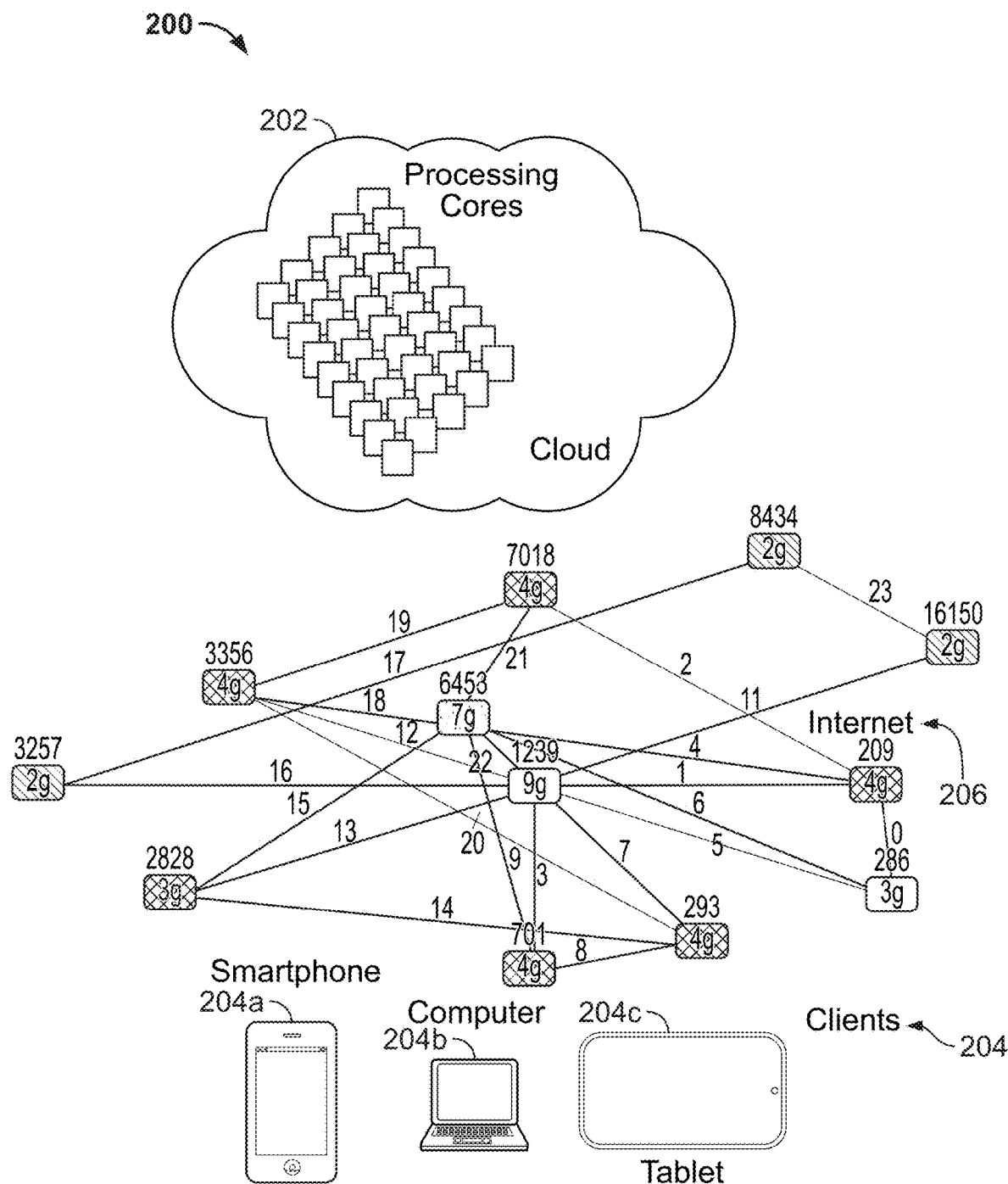
FIG. 2 shows an illustrative parallel processing environment to calculate network risk and resilience, based on the principles disclosed herein.

FIG. 2 shows an illustrative parallel processing environment 200 to calculate network risk and resilience, based on the principles disclosed herein. As described above, the disclosed principles compute q, r, b, k, v0, and identify sets B and L in large networks using both serial and parallel methods. The parallel computing environment 200 may be used for the parallel method. In the following example, n=the size of the network in terms of number of nodes; m=the number of links, and p=the number of processing elements used in parallel algorithms. Parallel computation methods for computing q, r, b, k, v0, and blocking node set B assume cloud computing equipment with a large number p>>1 of parallel processing elements, and the availability of parallelizing software such as MapReduce and Hadoop.

As shown, the cloud computing environment 200 includes a cloud or parallel computing portion comprised of parallel processing cores 202 accessed by a variety of client devices 204 (i.e., client devices 204a-204c) via a network 206 (e.g., the Internet). Serial algorithms are assumed to use p=1 processor while parallel algorithms use p>>1 processors. In one or more embodiments, it is desirable for the methods to be deployed in the parallel computing environment 202. Users access the parallel processing cores 202 in the cloud computing facility through various client devices 204 such as the laptop 204b connected to the Internet 206. Data is uploaded to the cloud computer running the methods for performing the network analysis disclosed here. Results are returned via downloading from the cloud computing facility to the client device 204 in the cloud computing implementation. Parallel processing is achieved through the use of many processing cores 202 on the cloud computing facility. Implementation of disclosed methods on parallel hardware is a new and novel approach not previously disclosed. Parts of the algorithm are parallelized, most notably the main cascading failure propagation algorithm that initiates many failures at all network components and observes the outcomes to calculate the frequency, consequence, and other risk and criticality results using a Monte-Carlo approach.

In some embodiments, cascading failures are simulated to obtain a resilience measure and tipping point that separates mild collapses from catastrophic collapses; flow simulations to obtain potential overloading of assets that may lead to triggering a collapse; and risk analysis, along with resource allocation to reduce risk, telling operators and planners where the best place is to allocate limited resources.

Figure 3:
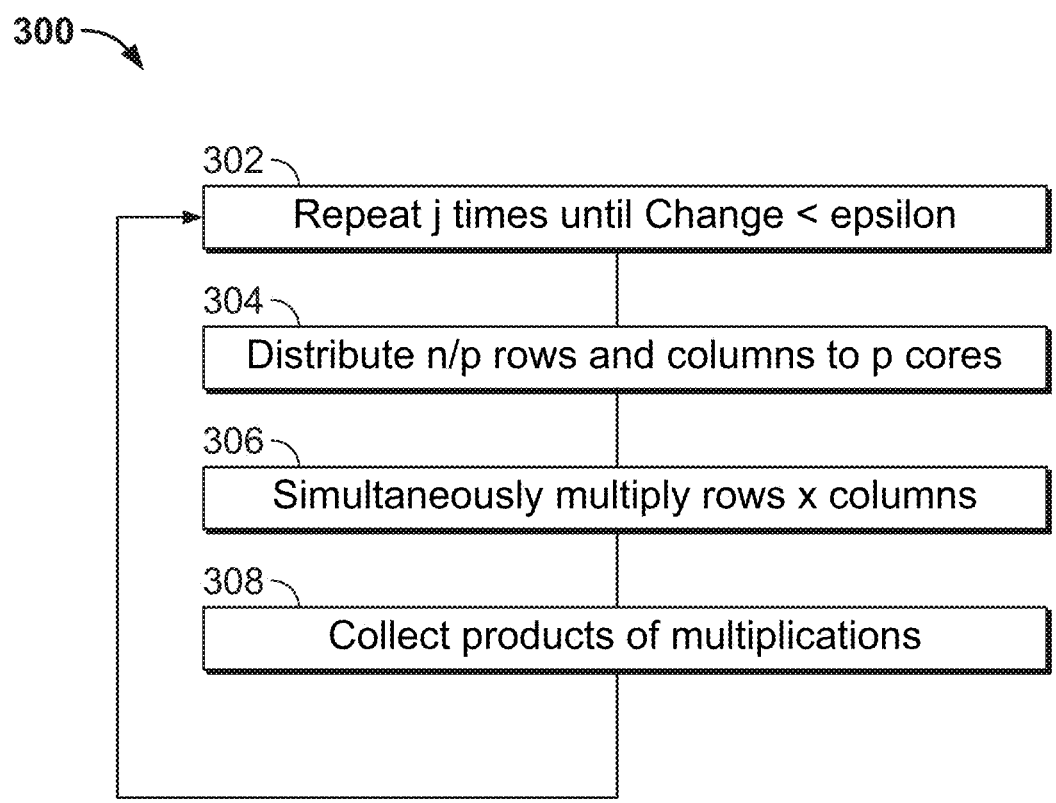
FIG. 3 shows an example flowchart of an illustrative method implementing the parallel algorithm for matrix multiplication, based on the principles disclosed herein.

FIG. 3 shows an example flowchart of an illustrative method 300 implementing the parallel algorithm for matrix multiplication, based on the principles disclosed herein. The method 300 may be used in the power method for p=n, which repeats j times until the result's change is less than error "epsilon" (step 302), distributes n/p rows and columns to p cores (step 304), simultaneously multiplies rows by columns (step 306), and collects products of multiplications (step 308). Spectral radius and spectral analysis in general require matrix arithmetic on very large matrices. Multiplying an n×n matrix takes $O(n^3)$ operations, for example, where n is number of nodes. Betweenness also consumes $O(n^3)$ operations because paths of length $O(n)$ may have to be traced for each of $(n(n-1)/2$ pairs of nodes. Large networks call for large n, which consume $O(n^3)$ computations. Therefore, using the illustrative method 300 having parallel processing, the computation time may be significantly lowered.

Figure 4:
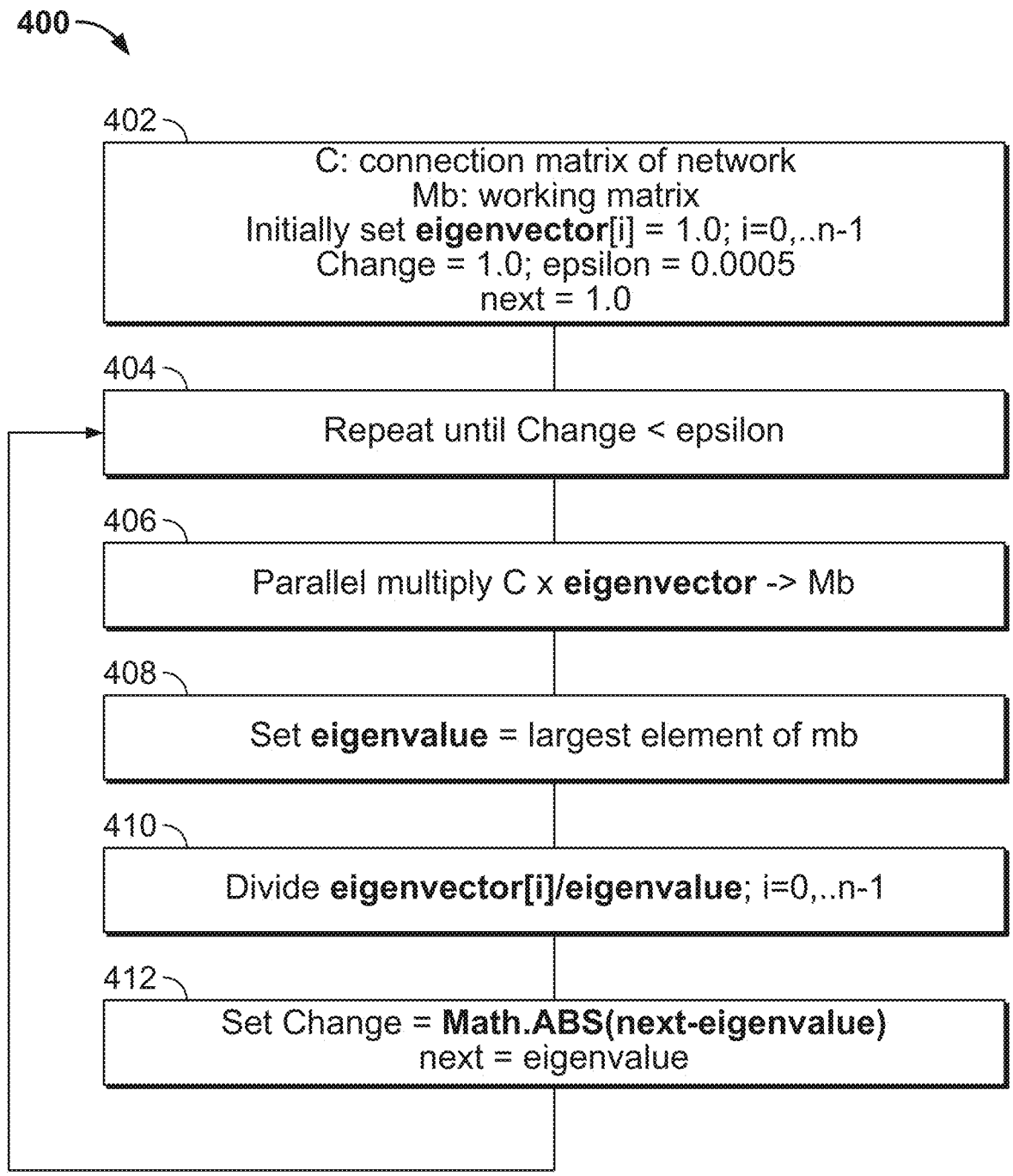
FIG. 4 shows a flowchart of an illustrative method of calculating eigenvalues of a network, based on the principles disclosed herein.

FIG. 4 shows a flowchart of an illustrative method 400 of calculating eigenvalues of a network, based on the principles disclosed herein. In particular, the method 400 is an illustration of a power method used to obtain the eigenvalues of a network (e.g., network 102 shown in FIG. 1A). In the shown method 400, C denotes a connection matrix and Mb denotes a working matrix.

The method may begin at step 402, where the eigenvector is initially set as 1, a change variable is set as 1, an epsilon variable is set as 0.0005, and step variable (next) is set as 1. At step 404, it is checked whether the change variable is less than the epsilon variable. The method 400 may be repeated until the condition at step 404 (change<epsilon) is fulfilled. If the condition remains unfulfilled the subsequent steps 406-412 may be performed before looping back to step 402.

At step 406, the connection matrix C is parallelly multiplied by the eigenvector to obtain the working matrix Mb. At step 408, the eigenvalue is set to the largest element of the block Mb. At step 410 the eigenvector element (eigenvector [i]) is divided by the eigenvalue. At step 412, the change step is set to the absolute difference between value of the next step and the eigenvalue. The next step is set as the eigenvalue.

For epidemic cascades it was observed that $\log(q)$ varies with spectral radius according to the equation, $\log(q)=b-kvr$, where r is a spectral radius the largest eigenvalue of connection matrix C. The spectral radius r generally represents the amount of self-organization in a complex system modeled as a network. Self-organization may be the major driver of the size of cascading collapse of complex systems. Therefore, spectral radius r is generally a significant metric in the embodiments disclosed herein. Specifically, structural resilience is related to resilience and asset vulnerability according to the fundamental resilience equation. As spectral radius r increases, resilience goes down. Therefore, the spectral radius may be computed as a first step in resilience analysis. A knowledge of the current spectral radius may facilitate restructuring to lower spectral radius.

As described above, the method 400 of spectral analysis repeatedly multiplies the n×n connection matrix times itself j>>1 times to obtain the eigenvalue corresponding with each node. These eigenvalues are useful in determining the influence of a node-a node with larger eigenvalue generally has more influence on cascade resilience. A node's eigenvalue generally increases with the node's number of connections. The largest eigenvalue is the spectral radius of the entire system, and the node with the largest eigenvalue may also be the most critical in terms of cascade resilience. The method 400 approximates the eigenvalues $\lambda$ of an n×n matrix in $O(jn^3)$ steps for j<<n using repeated matrix multiplications, where j<<n is the number of multiplications to reduce the connection matrix to its spectral decomposition equivalent, $[C-\lambda I]=0$. For very large n, distributing n/p rows and columns to p processors can further reduce the time complexity of matrix multiplication by a factor of p, because parallel multiplication takes place at the same time. Therefore, a parallelized spectral radius algorithm will estimate the spectral radius of connection matrix C in $O(jn^3/p)$ steps using p processors.

Figure 5:
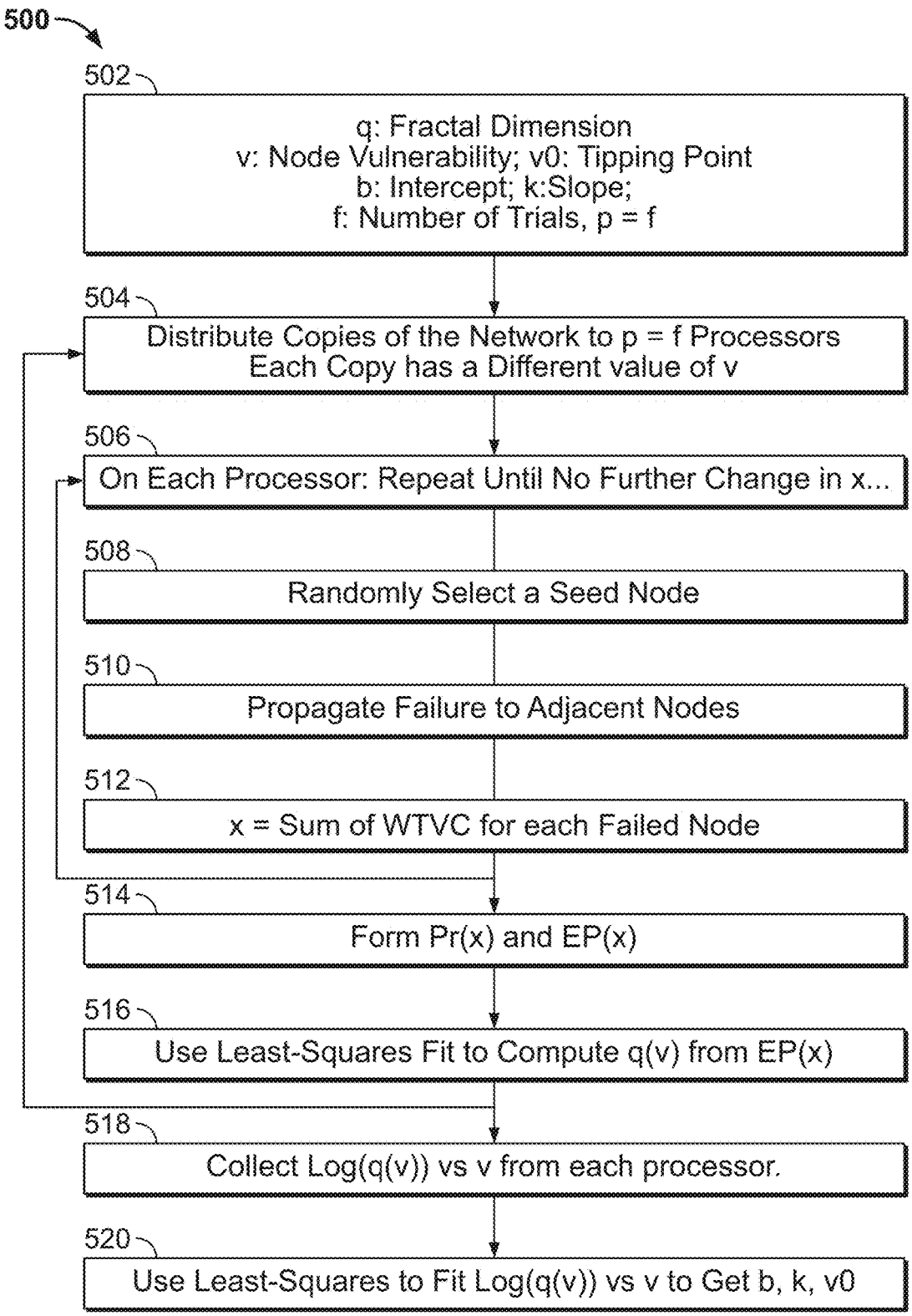
FIG. 5 shows a flow diagram of an illustrative method of distributing copies of the network to multiple processors, based on the principles disclosed herein.

FIG. 5 shows a flow diagram of an illustrative method 500 of distributing copies of the network to multiple processors, based on the principles disclosed herein. For the method 500, the following variables are defined in step 502 (which may not be a computing step and the variables may have been set up a priori): (1) q: fractal dimension, (2) v: node vulnerability, (3) v0: tipping point, (4) b: intercept, (5) k: slope, (6) f: number of trials, and (7) p=f. At step 504, the copies of the network may be distributed to p=f processors, wherein each copy has a different v value. Each of the recipient processors—each having a different v value—may perform a parallel compute loop of steps 506-516.

Within the parallel compute loop formed by steps 506-516, an internal loop formed by steps 506-512 may be repeated by each processor until the result x is no longer changing more than epsilon (as shown in step 506). Within the loop, at step 508 a seed node is randomly selected. At step 510, a failure from the randomly selected seed node is propagated to adjacent nodes. At step 512, x is to the sum of WTVC for each failed node. The loop formed by steps 506-512 is broken when there is further change in x. Then, at step 514, each processor forms the probability of event x (Pr(x)) and exceedence probability of event x (EP(x)). At step 516, each processor uses a linear fit, such as least squares fit, to efficiently compute the fractal dimension from the exceedence probability.

When finished with the parallel compute loop formed by steps 506-516, $\log(q(v))$ values from each parallel processor may be collected at step 518. At step 520, a linear fit, such as least squares, may be used to efficiently fit $\log(q)$ to v. The fit can then be used to solve for b, k, and v0 in the resilience equation. Furthermore, computation of fractal dimension q is done by simulation of cascade failures.

One having ordinary skill in the art will understand that calculation of method 500 is a very time-consuming on a single processor. Hence, the disclosed principles utilize the power of parallel processing in cloud computing facilities to perform risk and resilience analysis in parallel. Parallel processing may be practicable approach for networks of reasonable sizes.

As described in the method 500, the distribution of failures of size x=TVC, Pr(x), is obtained by repeatedly simulating the consequence of a cascading initiated by the failure of a randomly selected node s, called a seed node. Thousands of cascades are simulated to obtain Pr(x). Cascade spreading propagates with probability v along each link connecting an adjacent node with a failed node. The epidemic spreading stops when no additional nodes are affected. Therefore, a fractal dimension q(v) is obtained from each exceedence probability EP(x) that is derived from each histogram Pr(x) produced by multiple (e.g., thousands) of simulated cascades. A graph of $\log(q(v))$ versus v approximates a straight line with intercept b and slope k.

A different value of q(v) is generally obtained for each value of v. Plotting $\log(q(v))$ versus v yields another straight line. Parameters b and k are intercept and slope, respectively, of $\log(q)$ vs. v, over a range of values of v; $v_1, v_2, v_3, \ldots v_f$. Once b and k are known, tipping point $v_0$ can be calculated. The steps therefore can be enumerated as:

1. Perform a plurality (e.g., thousands) of cascades, one for each value of v to obtain q
2. Fit a least-squares line to log(q) vs. v to obtain b and k
3. Solve $v_0 = b/k$ to obtain the resilience chart and tipping point
4. Perform a plurality (e.g., thousands) of cascades using given values of v for nodes and links.
5. Solve for $v = [b - \text{Log}(q)]/k$ using b, q, and k from step 2.
6. Resilience may then be defined as $Z = v - v_0$ For very large networks, a speedup of p may obtained by using p parallel processors as further detailed in the illustrative method 500. The network may be distributed across p parallel processors. Multiple cascade failures may be performed in each processor (and simultaneously across the p parallel processors) by repeated trials, each trial starting with a randomly selected seed node s. The outputs from repeated cascades constructs one exceedence probability distribution EP(x) for each value of probability of failure v. This also produces one fractal dimension q(v) per probability of failure v. The process may be repeated for different values of v. The resilience equation $\log(q) = b - ky$ is computed in time proportional to O(ft) on one processor, and in time proportional to O(ft/p) on p parallel processors, where f is the number of points along the v-axis and t is the mean number of cascades simulated for each value of v.

The method disclosed herein applies network science properties to critical infrastructure systems modeled as networks to identify critical assets~nodes and links potentially subject to overloading or congestion during normal and extreme operation. For example, node connectivity and node influence are known to be highly correlated with propensity to cascade. Therefore, connectivity and influence are measures of topological stress. Similarly, links are subject to overloading and stress induced by bottlenecks, often measured by network science parameter betweenness, which is simply the number of shortest paths running through an asset by counting all paths from all nodes to all other nodes. Betweenness centrality simply counts paths and normalizes the path counts per node and link by dividing by the maximum number of node/link paths. Normalized betweenness provides a baseline metric for additional stress testing.

In one or more embodiments, essential nodes, so-called blocking nodes because their removal would segment the network into islands, may be considered to have infinite betweenness or bottleneck-ness. Similarly, essential links whose removal would separate the network into disjoint components or islands, called blocking links, may be considered to have infinite betweenness. Thus, blocking nodes/links are critical due to their extreme betweenness values. Unfortunately, computing betweenness is a very time-consuming algorithm because it is a brute-force method.

Figure 6:
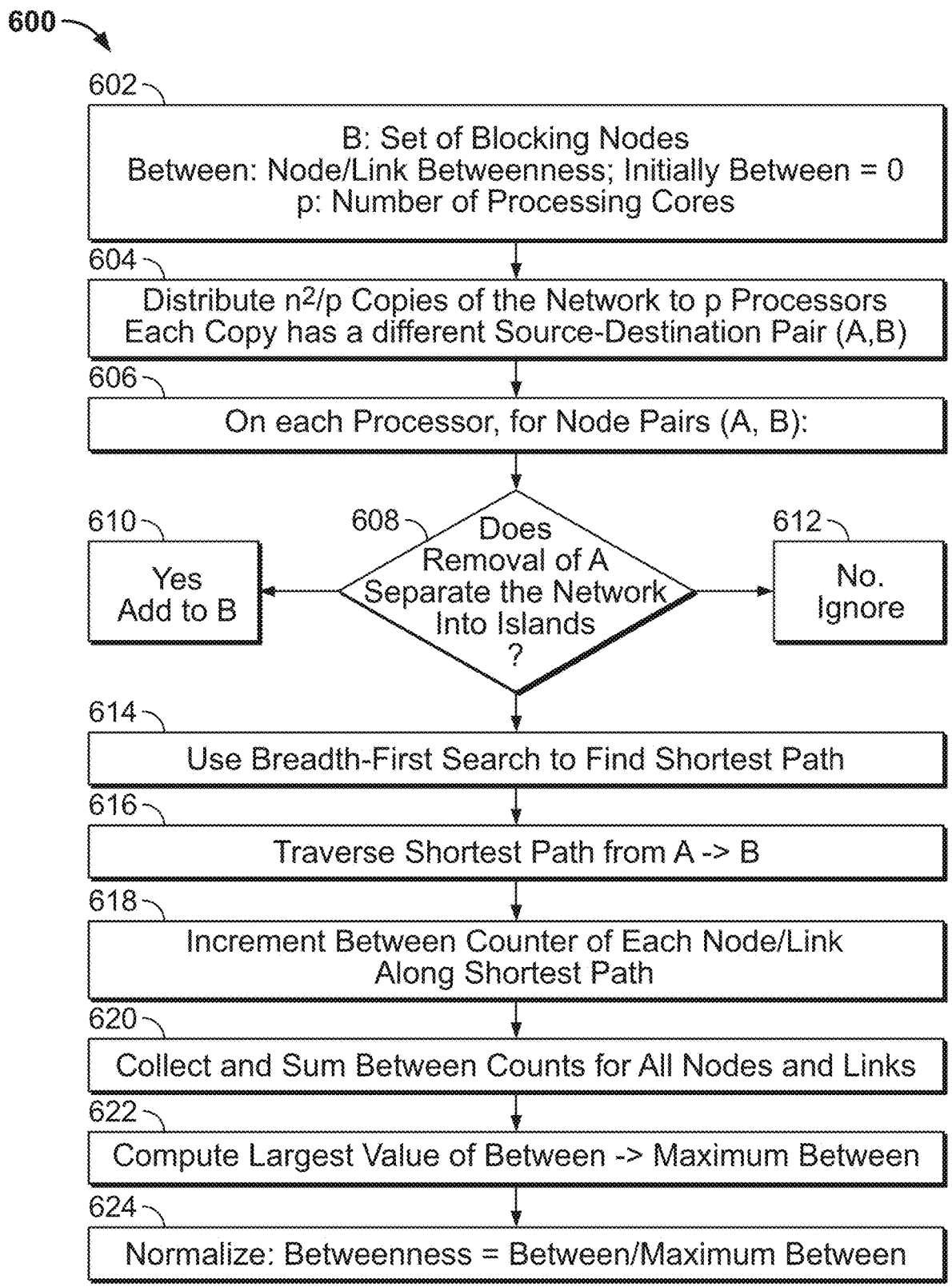
FIG. 6 shows an example flow diagram of an illustrative method of computing betweenness of a network, based on the principles disclosed herein.

FIG. 6 shows an example flow diagram of an illustrative method 600 of computing betweenness of a network, based on the principles disclosed herein. Betweenness centrality and blocking node set B (as well as blocking link set L) may be obtained on one processor in polynomial time. Betweenness centrality generally follows from counting the number of times each node is visited while finding the shortest path from node A to node B, for all pairs (A, B). There are n(n−1)/2 shortest-path pairs (A, B). Hence, it takes $O(n^2)$ shortest-path steps to trace all possible pairs of shortest paths through the network. Each shortest path takes O(log(n)) steps, so the total time is proportional to $O(n^2 \log(n))$. Blocking nodes and links also take $O(n^2)$ steps because for each node or link to be considered as blocking, an example process may compute the size of the strongly connected component remaining after the removal of a candidate blocking node/link. To make this process more efficient, parallel processing may be leveraged for the method 600 by distributing copies of the network to parallel processors where each copy has a different source-destination pair (A, B).

For the execution of the method 600, the following variables may be defined at step 602 (step 602 may not be an operational step as the variables may have been defined a priori): (1) B: set of blocking nodes, (2) between: node/link betweenness, (3) initial value of between=0, and (4) p: number of processing cores (or parallel processors). At 604, $n^2/p$ copies of the network may be distributed to p processors. Each copy of the network may have a different source destination pair (A, B).

Each parallel processor may perform steps 606-624. A given processor may evaluate node pairs (A, B) at step 606. At 608, the processor may determine "does removal of A separate this network into islands" If yes, the processor may add A to B at step 610. If no, the processor may ignore A at step 612. At step 614, the processor uses a breadth-first search to find the shortest path from A to B. At step 616, the processor traverses all components on the shortest path from A to B. At step 618, the processor increments the counter of each component along the shortest path. At step 620, the processor collects and sums counts for all components. At step 622, the processor computes the largest value of betweenness which is generally the maximum betweenness. At step 624, the processor normalizes the betweenness of each pair by the maximum betweenness.

In the method 600, a breadth-first search of the component (e.g., A) in time proportional to O(n) determines the size of the component. If the searched component contains fewer than (n−1) nodes, the candidate node/link is a blocking node/link. Otherwise, the candidate is not a blocking node/link. This search tracks the connectivity of (n−1) remaining nodes for each of n nodes—an O(n(n−1)) process, or O(m (m−1)) process for links. All blocking nodes have high betweenness centrality, but not all high betweenness nodes are blocking nodes. However, the correlation is high, so it is beneficial to perform the two together. The time to calculate blocking node set B can be sped up by a factor of p by distributing the network across p parallel processors and performing simultaneous calculations in $O(n^2 \log(n)/p)$ and $O(n^2/p)$ time, respectively. As described above, method 600 uses parallel processing for computing betweenness and blocking node set B. A similar method is used to obtain the blocking link set L.

Extremely large networks, n>>100,000, can further tax the computational ability of massively parallel cloud computers, so a further approximation is made by recognizing that most (but not all) blocking nodes lie on the shortest path between node pairs (A, B). A statistical method of estimating shortest paths is to randomly select pairs (A, B) and to compute the shortest path using e.g., Dijkstra's Algorithm for a sample of size k<<n. Then, the blocking node analysis is applied only to the highest-ranking shortest paths (the highest-betweenness) in the network. This has the effect of reducing n in $O(n^2 \log(n)/p)$, but with greater probability of missing a blocking node. In many cases, the number of blocking nodes lying on shortest paths is relatively high, accounting for 80-90% of all blocking nodes. A parallel method of sampling may be the same as the method 400 shown in FIG. 4, but fewer than O(n(n−1)) steps are required.

Input: The method is generally applicable to any system that can be modeled as a network or set of networks, which encompasses a broad range of systems, most notably sets of multiple interdependent networks of qualitatively different function. Networks may be input through a CSV file containing nodes and links or through a drag-and-drop interface.

Process: The method applies a combination of mathematical modeling and cascade fault simulations to obtain the outputs of infrastructure network risk and resilience estimates. The process relies on a sequence of calculations and simulations described below with regards to FIG. 7.

Figure 7:
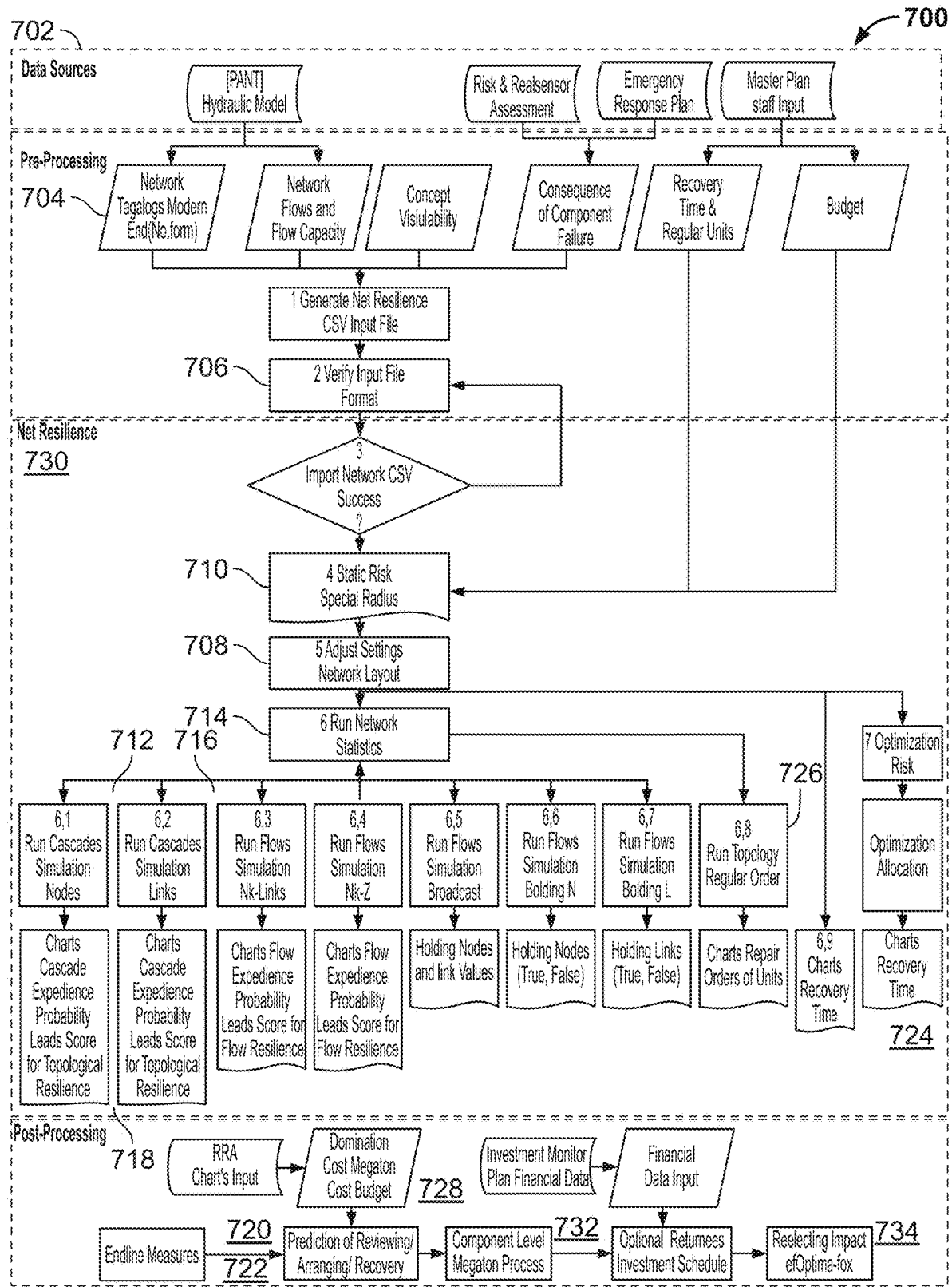
FIG. 7 shows a flow diagram of a method of calculating a risk reliance of a network, based on the principles disclosed herein.

FIG. 7 shows a flow diagram of a method 700 of calculating a risk reliance of a network, based on the principles disclosed herein. The method 700 may begin at step 702, where network topology, cost, vulnerability, and recovery asset data may be obtained from various sources. At step 704, the input data may be processed into the formats for the software algorithms. At step 706, the quality of the input data may be checked. At step 708, the software settings may be adjusted to suit the network operator's planning criteria. At step 710, spectral analysis—comprising spectral radius and influence (eigenvalues) may be performed. A step 712, static risk and dynamic cascade fault simulation and MPL risk analysis may be performed. At step 714, criticality factor calculations including for example betweenness, blocking, influence, and node degree may be performed. At step 716, flow resilience and overloading (N-k flow) analysis may be performed. At step 718, structural resilience analysis: $\log(q)=b-kv$; tipping point $v_0$, and flow resilience $q(y)$ may be performed. At step 720, network Restructuring (to reduce spectral radius; to increase resilience) may be performed. At step 722, Static risk analysis and optimal allocation of a budget to minimize risk may be performed. At step 724, recovery analysis in the form of recovery time and cost may be performed. At step 726, prioritization of repairs according to dependence (topological order) may be performed. At step 728, mitigation intervention budgeting and prioritization may be performed.

The levels of summary results and recommendations provided by the method 700 are summarized above in Table 1c. While being a single process, more outputs may be possible when more inputs are available. Significantly, baseline and level 1 results (step 730) are possible to compute for nearly any network system using readily available data. The baseline level uses information detailing node and link topology, and also flow (if applicable) only, and from these determines network properties, in particular most of the criticality factors that approximate the criticality of components for network resilience. The first level of results is based on inputs describing the component threat, vulnerability, and consequence, and allows the calculation of risk and consequence distributions along with structural, flow, and recovery resilience. The second level (step 732) incorporates accurate elimination costs and cascade vulnerabilities to produce accurate ranking and scope for the most cost-effective mitigation interventions that improve the network's risk and resilience. The third level (step 734) of results requires details on the system's master plan and time value of money (or borrowing rates) to translate the technical mitigation priorities into a recommended scope and budget and set and sequence of mitigations that optimize the system's return on investment for investments in resilience which reduce risk with respect to cascading failure.

In an embodiment, a method is provided for estimating the importance of each node and link collected in the network database with respect to the network's risk of financial or other loss due to cascading failure. The method identifies the relative importance of each component in the network with respect to cascading failure by computing several different criticality factors, each of which indicates the component's relative importance, and one of which will be the most strongly related to risk and resilience in any particular network system. Many criticality factors are computed, and then the factor(s) most closely related to risk and resilience are determined through correlation of those factors to the risk and resilience measures for the network; the factor(s) for which increasing measure most strongly increase risk and/or decrease resilience, as measured by (for example) a linear correlation between the factor and the risk or resilience, are the most important for that network. The criticality factors are computed using the standard well known algorithms, or by fast algorithms described elsewhere in the embodiments. Criticality factors are generally the focus of mitigation efforts designed to reduce risk and improve resilience with respect to cascading failure in networked systems.

An example criticality factor includes a Parameter Threat (T), which is a number in [0, 1] that may be entered as an input to or computed by the process. It is one of the primary parameters used in static risk, TVC, and impacts dynamic risk, MPL. It can be interpreted as the probability of an attack on an asset with malicious intent or as the likelihood of an accidental event such as a flood or hurricane. Alternatively, a unique attacker-defender competition process may be used to estimate T based on consequences C of nodes and links. This process applies a Stackelberg competition to determine an optimal T such that a hypothetical attacker attempts to increase expected loss over all nodes and links and a defender attempts to decrease loss. The Stackelberg competition is asymmetric: the attacker maximizes VC and the defender minimizes TVC across all assets. Both competitors are assumed to employ equal resources defined as a budget, B. The severity of the threat is an important criticality factor because components under greater threat are likely to be involved in more cascading failures.

Another example criticality factor includes vulnerability (V), which is a fraction in [0,1] that may be entered as an input to or computed by the process. It is one of the parameters in the traditional definition of risk. Vulnerability quantifies a probabilistic weakness in a system such as a flaw in software that permits malware to spread, a mechanical weakness due to an aging infrastructure component, or susceptibility to failure due to an accident.

Yet another example criticality factor includes static vulnerability (V), which is a basic input into the basic risk equation R=TVC. Additionally, dynamic vulnerability, or vulnerability to cascading failure, V_C, is a basic input to calculation of resilience and of the consequence distribution. V and V_C may be identical, or correlated, or totally different, depending on the physics of the system; often they are correlated but distinct quantities. For example, the vulnerability of a component to random failure may be a function of its age, but its age may also be a contributing factor in the vulnerability of that component to fail when a connected component fails, for example due to overloading of that connected component resulting in subsequent overloading of connected components. Vulnerability is an important criticality factor because components that are more vulnerable in either the static or dynamic sense are likely to be involved in more cascading failures.

An additional example criticality factor includes consequence (C), which is typically measured in dollars or data records in a malware attack, for example, and gallons or packets in a flow network. More consequential components are more critical and also tend to be involved in more cascading failures by virtue of their central role in the system's functionality, and are therefore more important.

The number of links through which a node is directly at the first degree connected to other nodes is the connectivity (also called node degree, per the standard mathematical usage). Nodes that are connected to more other nodes tend to be more critical for cascading failure because each connection is a potential pathway along which a failure can cascade.

The fraction of failure scenarios in which a component participates in a cascading failure is referred to as the cascade frequency. Components that more frequently participate in cascading failures are more critical and important because they tend to be the pathways by which high-consequence cascading failures propagate regardless of their origin.

As described above, influence or spectral radius is the largest eigenvalue of connection matrix C. It represents the amount of self-organization, or self-referential or looping structure, in a complex system modeled as a network. Self-organization is a major driver of the total risk and consequence of cascading collapse in networked systems, so greater influence of a component on other components makes it more critical and important for controlling cascading failures.

Blocking nodes separate network subgraphs from each other and are capable of completely severing one subnetwork from another if switched off. A node or link is blocking if its removal segments the network into disconnected components or "islands." They are called blocking because their removal blocks flows from one part of the network to other parts. Blocking node/link analysis is important in flow analysis of the spread of malware, epidemics in human networks, and resilience under stress. Blocking analysis suggests optimal places to defend a network against attacks because a blocking node is also the best place to block the spread of malware, faults, etc. Blocking nodes are generally critical and important because they are capable of propagating or halting a cascading failure. For example, if a sensor and valve are placed at a blocking node on a pipe network, contamination can be sensed and then blocked from propagating through the system; or, in an electricity network, a microgrid at a blocking node could disconnect from a failed part of the transmission network to maintain service on the other side of the blocking node.

Betweenness is the number of shortest paths that pass through a given network component on the way between all other pairs of components. A simple bottleneck is obtained by computing the betweenness of the bi-directional network. Betweenness is the normalized count of number of paths through each node/link created by the shortest path from node A to node B for all A and B nodes in the network. Missing link bottleneck is the largest value of normalized betweenness obtained from a directed network with one link is missing, over all links. Components that are between a lot of other components tend to be more critical and important because they are pathways for propagation of cascading failures through the network.

The ratio between the flow through a component and its rated flow capacity is the overload ratio. Overloads occur in a directed flow network when one or more links collapse forcing the flows to switch to alternative paths, if they exist. However, re-routing a flow may overload one or more alternate pathways containing nodes and links with finite capacity. Overload is a ratio of load to capacity for re-directed flows. The overload metric is the normalized maximum overload obtained by analyzing all possible missing nodes/links. Higher overload ratios are associated with a higher probability of failure in a wide variety of physical network systems. Components with higher overload ratios tend to be involved in more cascading failures because they have less buffer and spare capacity free with which to absorb flow shocks.

Components with higher flow capacities (e.g., kW, gallons per hour, etc.) tend to be involved in more cascading failures and higher-consequence failures because they tend to be functionally more important in networks and because they tend to be called upon to absorb excess flows when other components are overloaded. Also, because high capacity components are more important for function, they tend to be targeted preferentially by attackers.

In some embodiments, a method for estimating missing network attributes (e.g., component vulnerability, failure probability, and cascade or contagion cascade propagation and loss probability) is provided. These estimated missing network attributes may be derived from basic network statistics that apply equally to all kinds of networks. Many inputs required for these calculations may not be available for all networks, so it is practically essential important that they be estimable, at least in a relative or approximate sense, from more readily available inputs. The network topology is often readily available information, and can be used to estimate some other inputs.

For example, vulnerability V, and especially the cascade (or dynamic) vulnerability V_C for which values are often unknown, may take on values of or values correlated to one of the criticality factors. V is restricted to the interval [0, 1], but the sigmoid function is applied to values outside of the numerical interval [0, 1] to normalize to the interval [0,1].

For contagion-style cascading failures (i.e., those covered by structural resilience and risk calculations), some criticality factors include connectivity, cascade frequency, and influence. For flow-style cascading failures (i.e., those covered by flow resilience and risk calculations), some appropriate criticality factors include bottlenecks, N−1 bottlenecks, overload ratios, and blocking components.

Vulnerability may be a user-defined input or may be estimated using one of the critical factors listed above. In order to enhance vulnerabilities to exaggerate differences between components and increase contrast to calibrate network cascading failure probabilities to match an expectation, V may be "sharpened." For example, Markov clustering sharpens V using a criticality factor by applying the Markov cluster algorithm to the entire network, as follows: Creating an n×n matrix MM with node vulnerabilities (which might be estimated as criticality factors) along the diagonal and using link vulnerabilities everywhere else. MM is symmetric so the upper half is identical to the transposed lower half containing link vulnerability v[i, j], where i and j are nodes connected by a link from node i to node j. The clustering process enhances the values of vulnerability of nodes and links by increasing the contrast between lower and higher values. The steps of this method are enumerated below.

1. Square MM;
2. Inflate MM by squaring each element of MM;
3. Normalize MM by dividing every row element by the row sum;
4. Prune MM by setting every element to zero if it exceeds a threshold; and
5. Sharpen node/link vulnerability by setting v to the elements of MM.

Likewise, most physical components become more vulnerable to faults and failures of all kinds with age. Aging is a form of estimation for V that assumes V changes—generally increasing-over time. The Weibull distribution is used to model ageing as follows. Replacing V with $1-(1-V)^r$; where t is an appropriate unit of time. For example, given V=0.1 initially, and t=10 years, V ages to 0.65.

For components where the relationship between flow, capacity, and failure probability are not known for components, a Gaussian-style S-curve integral may be used, or a linear approximation thereof, to estimate the shape of the relationship.

In a further embodiment, a method for effectively prioritizing mitigation interventions and investments to reduce the network's total risk or consequence posed by cascading failure is provided. The method may be based on relative efficacy and/or net cost effectiveness, using the combination of at least five distinct prioritization methods.

Figure 8A:
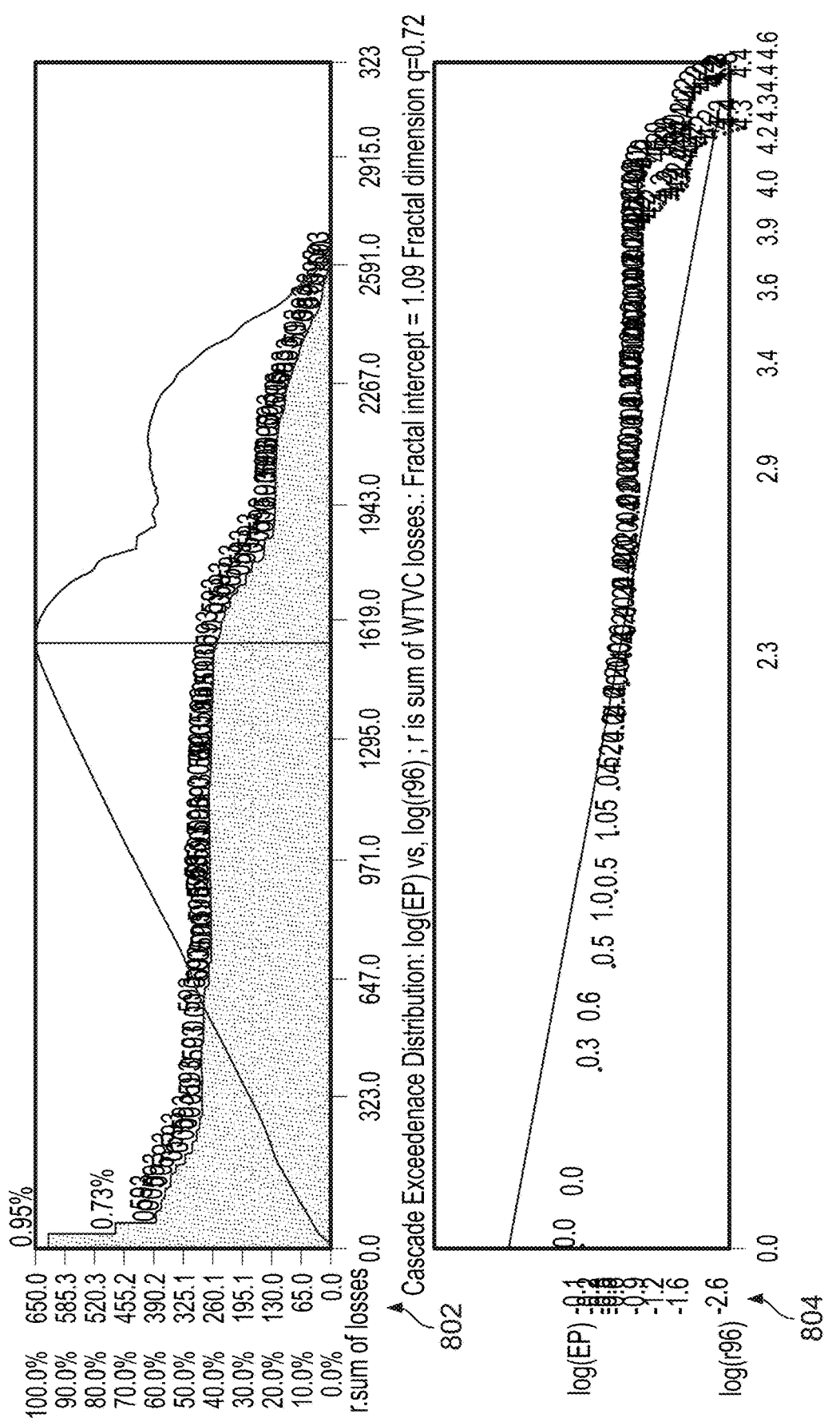
FIG. 8A shows an illustrative interface showing results generated during the execution of one or more embodiments, based on the principles disclosed herein.

FIG. 8A shows an illustrative interface 800a showing results generated during the execution of one or more embodiments, based on the principles disclosed herein. Particularly, the interface 800a shows a result 802 of the consequence distribution and Maximum Probable Loss as the peak of the EP×P distribution of the network. The interface 800a also shows a result 804 from fitting a log-log linear function to the EP versus r distribution of the network to estimate the network's fractal dimension q for the resilience equation.

Figure 8B:
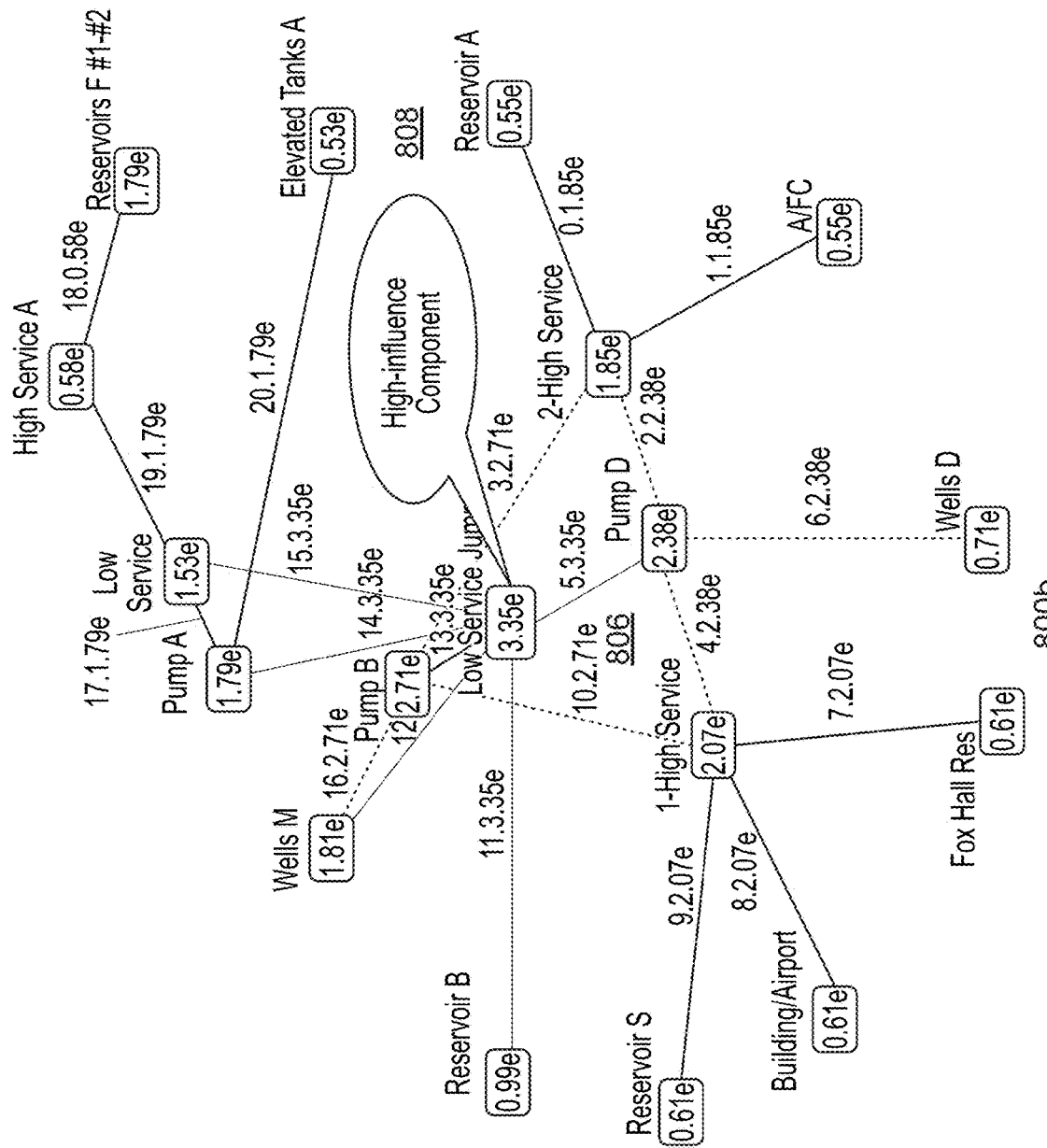
FIG. 8B shows an illustrative interface showing heat map of criticality factors, based on the principles disclosed herein.

FIG. 8B shows an illustrative interface 800b showing heat map 806 of criticality factors, based on the principles disclosed herein. Particularly, the heat map 806 may be used to identify the most critical components (in this case, high influence) 808 within the network.

Figure 8C:
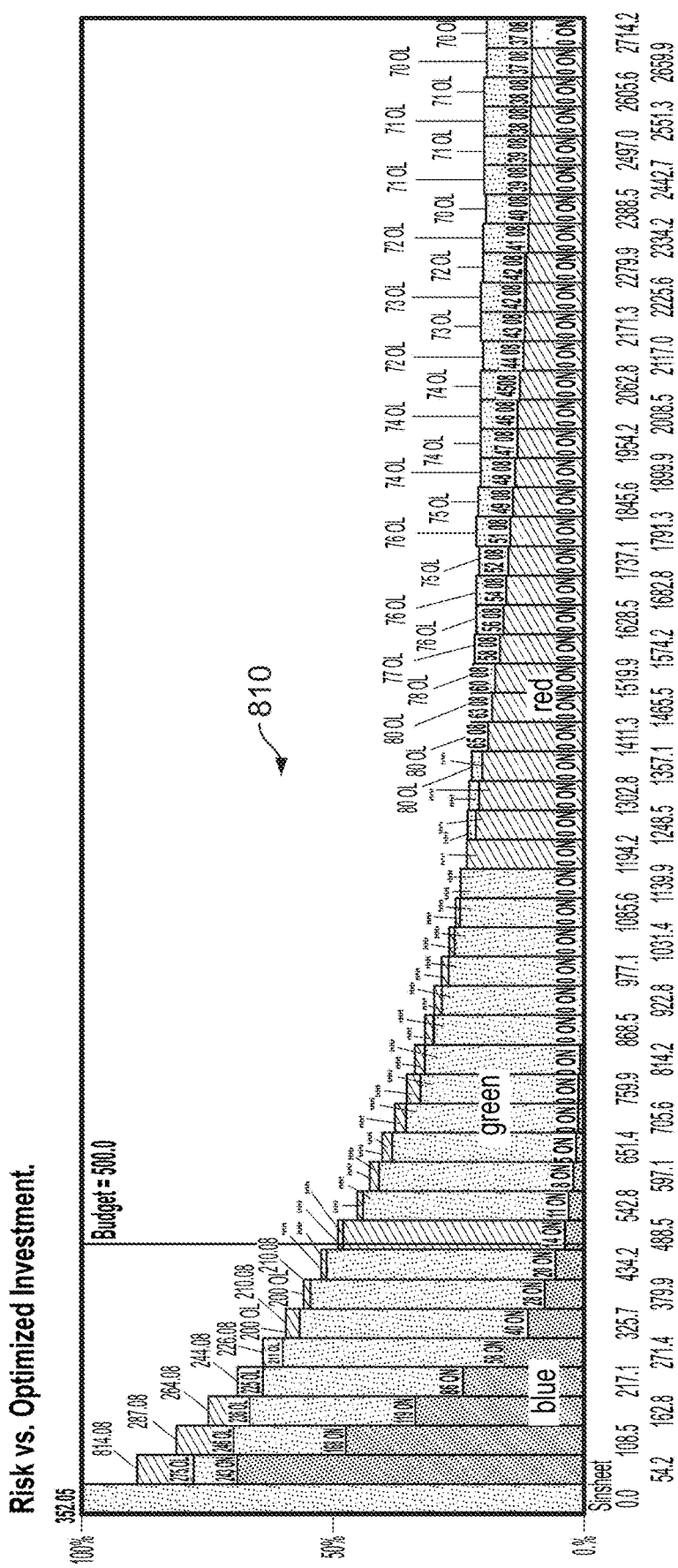
FIG. 8C shows an illustrative interface showing a graph depicting an example cost for mitigating (or even eliminating) component vulnerability, based on the principles disclosed herein.

FIG. 8C shows an illustrative interface 800c showing a graph 810 depicting an example cost for mitigating (or even eliminating) component vulnerability, based on the principles disclosed herein. The graph 810 may facilitate priority based component vulnerability mitigation. For example, the mitigations may be based on diminishing returns to the investment in mitigation measures (e.g., rewiring, recovery assets, and overload ratio reduction are some other mitigation options in addition to vulnerability, static risk, link cascades, and node cascades). For example, mitigation measures towards the left of the budget constraint (e.g., the blue zone) may be implement whereas the mitigation measures towards the right of budget constraint (e.g., the red zone) may not implemented.

Figure 8D:
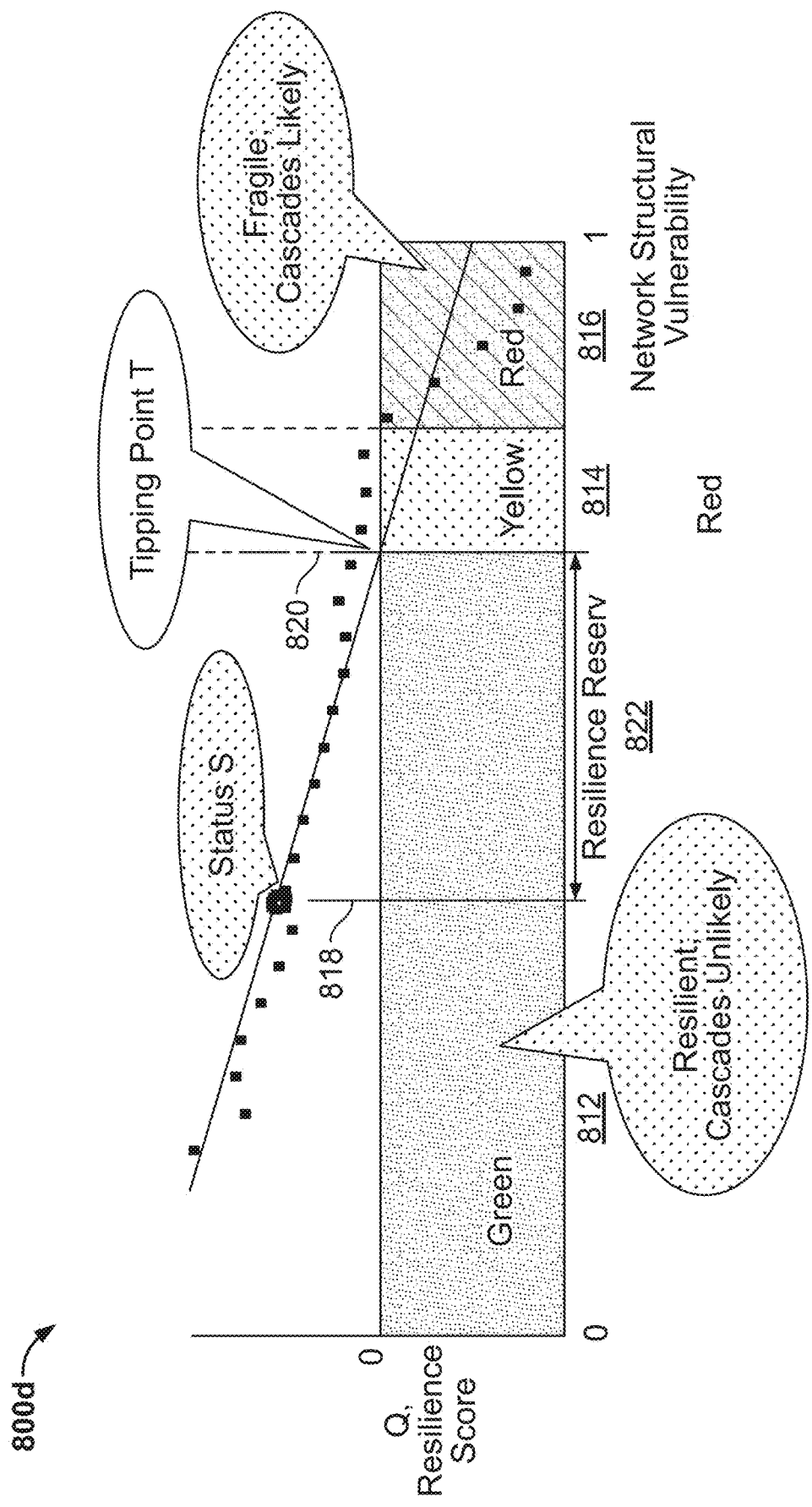
FIG. 8D shows an illustrative interface showing resilience scales and benchmarks, based on the principles disclosed herein.

FIG. 8D shows an illustrative interface 800d showing resilience scales and benchmarks, based on the principles disclosed herein. As shown, the resilience score may range from [0,1], and, based on the score, the resilience of a network may be benchmarked being in a green zone 812 with no likely cascading errors, an intermediate yellow zone 814, and a red zone 816 with cascades likely. The boundary between the green zone 812 and the yellow zone 814 may be referred to as a tipping point 820, after which the network enters from a territory of being resilient toward the territory of being less resilient. As shown, the current status of the network is at 818, i.e., within the green zone 812. The distance between the current status 818 and the tipping point 820 may be referred to as a resilience reserve 822, which may the amount of resilience buffer allowed before the network veers into less resilient territory.

Figure 8E:
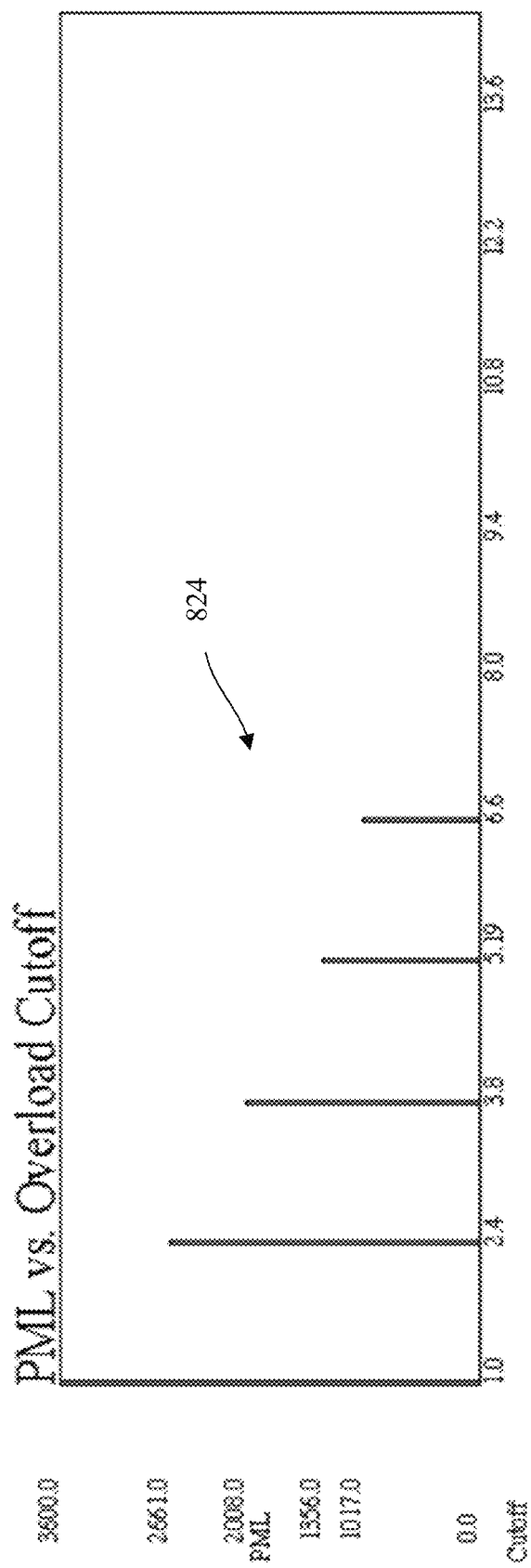
FIG. 8E shows an illustrative interface showing an effect of an improvement in a criticality factor, based on the principles disclosed herein.

FIG. 8E shows an illustrative interface 800e showing an effect of an improvement in a criticality factor, based on the principles disclosed herein. As shown, a graph 824 of the effect of an improvement in a criticality factor (e.g., overload ratio) for improving performance (e.g. risk, ROI, resilience reserve, consequence, recovery time, and or structural cascade resilience) for decision-making purposes. For example, the right side of the graph 824 may correspond to a higher degree of improvement and the left side of the graph 824 may correspond to a lower degree of improvement. Therefore, using the numerical improvement metric, an optimal network error prevention and or mitigation strategy may be determined.

Prioritization results as a ranked list of components (e.g., nodes) where mitigation should be targeted first lends itself to a clearly defined risk mitigation strategy within a complicated networked system. Therefore, the embodiments disclosed herein reduce risk and increase resilience against cascading failure based on statistics and modes of the consequence distribution. In practical applications it may be desired to prioritize investments that do the most to reduce risk and improve resilience by either mitigating V (e.g., by hardening the component) or by improving criticality factors (e.g., by reducing the spectral radius of a component by rewiring the network). Component level prioritization can be established on the basis of the best performance ratio, which may be based on the improvement in risk or resilience measure performance divided by the degree of mitigation (e.g. reduction in V or spectral radius, etc.), or on the basis of cost-effectiveness, in which case the cost of the mitigation is included as a multiplier in the denominator of the performance ratio.

The real-world cost of improving V or another criticality factor is often unknown or requires expensive engineering cost analysis to establish. Therefore, it is desirable to begin with a simpler method for estimating the relationship between a set of mitigation investments and the cumulative improvement in the system's risk. Significantly, it is possible to do this in an approximate and relative sense, without requiring real engineering cost data, by comparing the marginal reduction in risk (units of consequence e.g., dollars ($)) from each marginal set of investments in component level mitigations, using a diminishing returns model relating mitigation investment to component level V or criticality factor improvement. This yields a different type of prioritization of investment based on diminishing returns. The embodiments disclosed herein therefore employ a novel vulnerability reduction model based on diminishing returns, e.g., initial investment yields more vulnerability reduction than does follow-on investment. For example, this form of diminishing returns is modeled using an exponential model: $V=V(0) \exp(-aI)$, where $V(0)$ is an input value, I is an optimal investment amount, and $a=\log(Vmin/V(0))/E$, for each node/link. This modeling generally produces an optimal return on the investment for any given hypothetical investment amount, assuming diminishing returns. This modeling thereby establishes a different type of prioritization for both the ranked order of and degree of investment in component level mitigation factoring. This modeling therefore allows a component to be partially mitigated because a partial mitigation may be the most cost-effective owing to the principle of diminishing returns.

The embodiments disclosed herein may further be based on game theory. As understood in the art, game theory dictates that an intelligent attacker will choose to apply their threat T to the most vulnerable and risk-inducing components—as opposed to a random attack. As a result, it is desired, based on the tenets of game theory, to prioritize mitigation investments for reducing risk and for improving resilience against intelligently targeted threats. To accomplish this, a criticality factor is targeted for mitigation by setting V to a normalized version of that criticality factor and then allocating resources to reduce V. A novel optimization algorithm called DAD (Defend-Attack-Defend) is disclosed that realistically models threats and applies Stackelberg optimization to obtain estimates of, for each node and link, threat probability T and vulnerability V. The embodiments disclosed herein may apply a defender allocation of resources to minimize vulnerability V, called algorithm D, followed by an attacker allocation of equal resources to maximize threat T, called algorithm A, followed by a second application of D to counter the increase in T. This pattern of D followed by A followed by D is repeated until no further change in risk is observed. This approach differs from earlier approaches by assuming diminishing returns.

Figure 9:
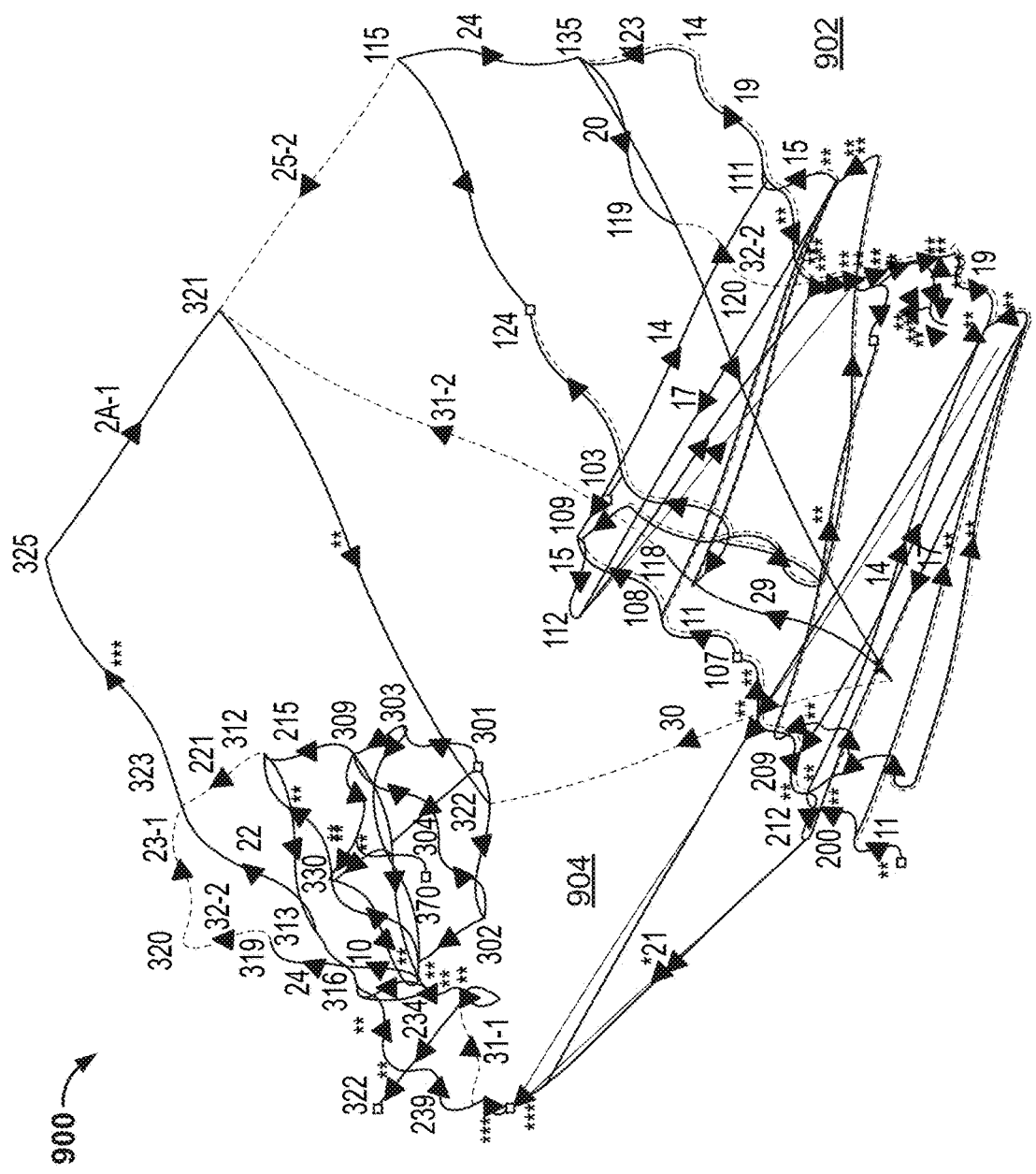
FIG. 9 shows an example network, which may be restructured based on the principles disclosed herein.

FIG. 9 shows an example network 900, which may be restructured based on the principles disclosed herein. Because the spectral radius and blocking nodes are major factors in network structural resilience and risk, and the spectral radius is purely a function of network topology, restructuring the network topology to eliminate (or introduce) blocking nodes and to reduce the influence of key components and to reduce their ability to propagate consequential cascading failures is an effective way to reduce risk and improve resilience. There are at least two classes of restructuring algorithms: (1) Node splitting (or combining), which also removes blocking nodes; and (2) Rewiring (add/remove links) to add redundancy and remove blocking nodes. For example, within the network 900, there are two clusters 902 and 904, joined by a few communication links. To improve the resiliency of the network 900, additional links may be added between the clusters 902 and 904.

Splitting a high-influence node into two nodes connected by a new link reduces spectral radius of the network, which reduces r in $\log(q)=b-kvr$. This increases resilience, but also increases the number of assets.

Rewiring is a nondeterministic process that minimizes MPL risk for either cascades or flows. For instance, a genetic algorithm iterates over rewired links until a minimum is found. Rewiring is random and does not generally alter the TVC values of nodes/links.

Blocking nodes separate network subgraphs by linking them through a single node, so splitting a blocking node or rewiring to add a redundant connection between subgraphs is a common strategy for mitigation. However, in some instances, it may be desirable to introduce blocking nodes; removing them may not always be a helpful strategy.

The embodiments disclosed herein feature a novel computer-automated method that identifies the priority of nodes and links; and recommends an order of repair based on topological sorting of the directed network so that assets that precede one another are repaired first. A directed infrastructure network defines a dependency of assets from source nodes to sink nodes. A topological sort on the directed network prioritizes nodes and links from source to sink. The topological sort rank defines the repair order to recover the entire network according to the dependencies. Optionally, the user can override this order by manually entering priorities that then serve as constraints for the recovery order optimization. Every asset in an infrastructure network is assigned an estimated recovery cost and estimated recovery time as input, or if unknown, a default value is assigned to all assets. Repair times are assumed to vary statistically, so simulated time to repair is sampled from a statistical distribution (here, an exponential distribution) with assumed or measured mean time to repair.

Figure 10A:
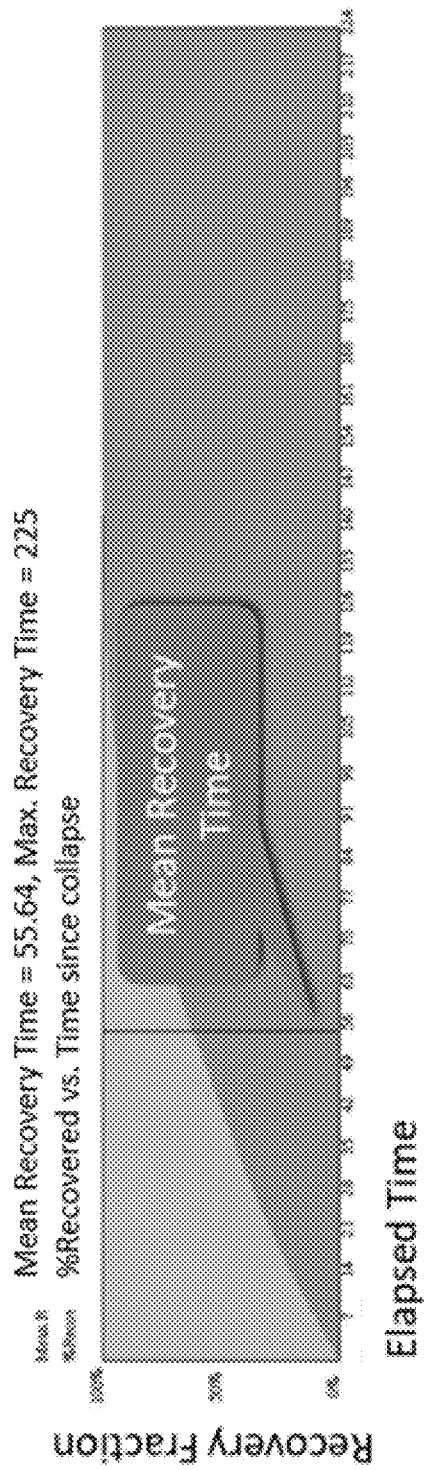
FIG. 10A shows an illustrative a graph with recovery time distribution, based on the principles disclosed herein.

FIG. 10A shows an illustrative a graph 1000a with recovery time distribution, based on the principles disclosed herein. As shown in the graph 1000b, the mean recovery time may be 55.64 time units (e.g., seconds) and the maximum recovery time may be 225 time units.

Figure 10B:
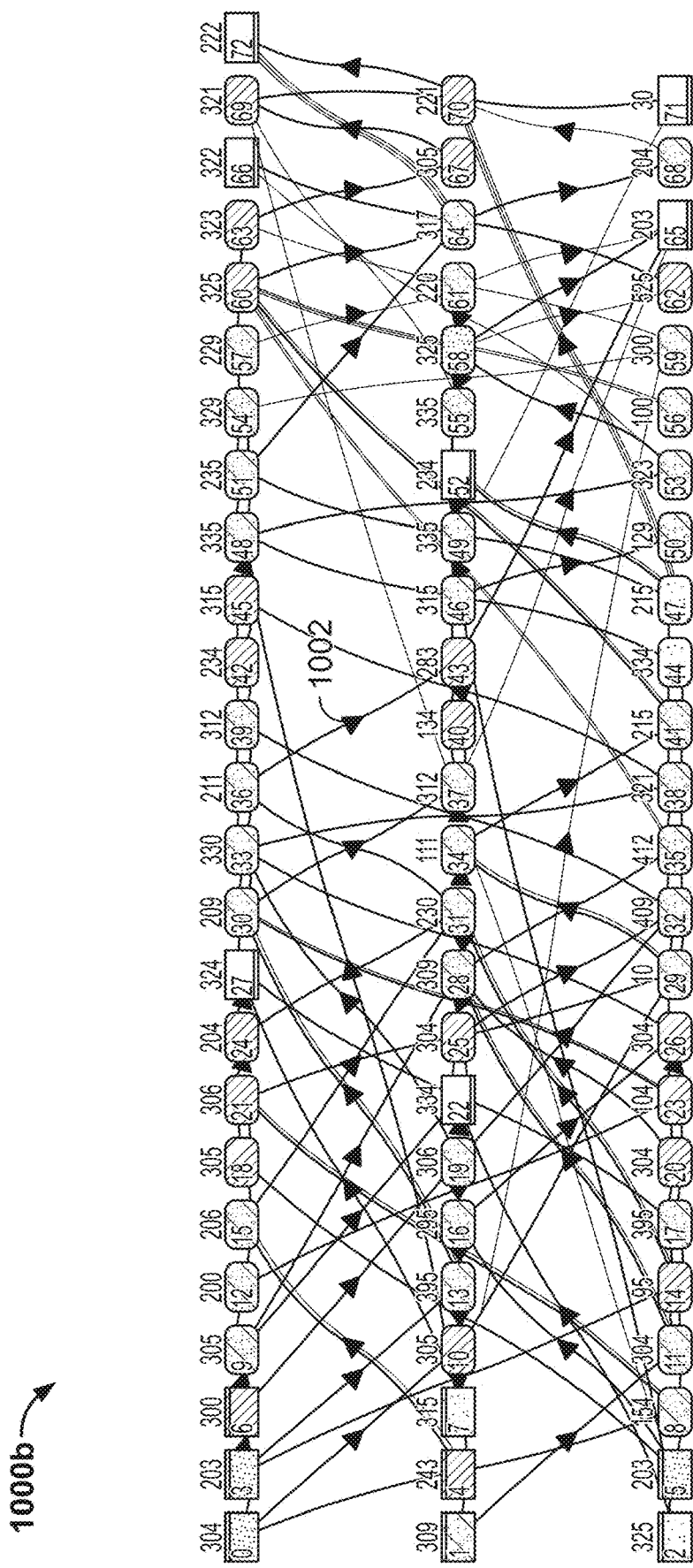
FIG. 10B shows an illustrative graph with a multi-layer network recovery order, based on the principles disclosed herein.

FIG. 10B shows an illustrative graph 1000b with a multi-layer network recovery order, based on the principles disclosed herein. Using the graph 1000b, once the recovery dependency sequence is established, optimal recovery order may be determined for any given failure event, and the recovery time and cost distribution for the network may be calculated.

An input value U is the number of repair units that can operate at the same time, to speed up recover time. Thus, recovery resilience is quantified in terms of the time for U repair units working in parallel to repair nFault failures, each with a nondeterministic repair time. The value of nFaults is also nondeterministic for adjacent cascading, hence, simulation of cascades to find nFaults is nondeterministic. Instead, a probability distribution of repair time is produced. Mean time to recover from all faults is a large-grained measure of recovery resilience. Similarly, the average cost over all damages is sampled from thousands of simulated cascades. Embodiments disclosed herein therefore simulate cascade failures by repeatedly faulting one node or link, triggering a probabilistic cascading failure that totals nFaults for each cascading failure, with the trigger repeated many times. Therefore, the number of nodes or links that need to be repaired after each cascade is nFaults. nFaults obeys a long-tailed probability distribution, because cascading is a nondeterministic process that obeys a power law. Given U repair units, the distribution of repair times for nFaults may be generated. Embodiments disclosed herein compute the repair time distribution by counting the repair times for repeated cascades and constructing a histogram of frequency versus repair time. More repair units operating in parallel means less time to repair, so the mean value depends on the number of repair units U. As soon as a repair unit completes a repair, it is assigned the next waiting fault to repair. A schedule for repairing nFaults assets with U repair units working in parallel is generated for each specific cascading failure that was observed as simulated in the network. Although the schedule is specific to the failure event, the average order in the schedules may be observed for every component, and this can be used as a guideline for recovery order for general purposes when a specific schedule is not available. In a related embodiment, a computer-automated method of comparing multiple sets of mitigation interventions is provided to satisfy multiple risk and resilience objectives.

The disclosed methods result in a set of multiple risk and resilience metrics with respect to cascading failure performance of a network, and it is practical to apply any kind of multiple-objective decision optimization framework (e.g. Pareto, Nash, Weighted-Scoring, Economic Valuation, etc.) to choose the best set of mitigation interventions from among the alternative sets. The risk and resilience metric outputs that are considered in a multiple objective optimization include, for example, Structural Cascade Resilience, Flow Cascade Resilience, Recovery Resilience—Time (Maximum, mean, etc.), Recovery Resilience—Cost, Static Risk (TVC), Dynamic Risk (MPL, Mean, Maximum, etc., of the consequence distribution), and Direct, Indirect, Financial, Reputational, Lives, etc. versions of consequence.

In one or more embodiments, a computer-automated method for visually communicating to a human user the network's overall risk and consequence with respect to cascading failure is provided.

One example result of the disclosed embodiments is a simple set of easily understood figures and metrics that reduce the analysis and synthesis to graphical and symbolically coded results indicating decision makers whether or not their network is resilient. For example, FIG. 8D shows one version of the structural resilience scale. As shown, the network's status 818 is separated by a positive factor of safety (a resilience reserve 822 of roughly 30%) from the fragility (or cascading failure likelihood) tipping point 820, and is therefore coded "green" because this network is unlikely to experience high consequence cascading failures due to random, targeted, or all-hazards failures in the network. Yellow zone 814 and red zone 816 indicate status that would be concerning because the network is not resilient to cascading failure in that case and is fragile. If the network's attributes change due to damage or investments in mitigation, the network status moves in the interface 800d following the fundamental resilience-vulnerability relationship of this network. For example, a higher vulnerability reduces resilience, and a vulnerability criterion below roughly 70% yields a resilient network given its current topology and other attributes. Decision makers can use this simple visual indicator and metric to understand whether their network is fragile or resilient, and the desired resilience improvements translate directly into reduced risk and cost via optimally prioritized component level investments. As other examples, FIG. 8C shows the interface 800c to visualize cost-based mitigation priorities, FIG. 8B shows the interface 800b to visualize the most critical components, and FIG. 8E shows the interface 800e to visualize the relationship between risk and criticality factor values. This unique combination of multiple visualizations allows the decision maker to determine the amount of mitigation to perform and where to target that mitigation for greatest efficacy and cost-efficacy.

Heat maps are commonly used to visualize quantitative information such as temperatures on a weather map, spread of fires and contagions, and traffic congestion in road networks. Embodiments disclosed herein extend this idea to visualization of criticality factors in networks, and by extension the priorities for mitigation that can be obtained based on criticality factors. As detailed above, FIG. 8B shows the interface 800b illustrating a network heat map of a criticality factor (in this case influence), which may facilitate identification of the most critical components that contribute the most to high consequence cascading failures. In the interface 800b, four components stand out as the most critical because they are the most influential and are coded in the hottest colors red and fuchsia. The combination of network map, heat map, and criticality factor scaling communicates mitigation priorities that will disproportionately increase resilience and reduce risk with respect to cascading failure in a network.

As another example of visualization, the structural resilience scale compares the fractal dimension (or resilience score) on the y-axis, the system's structural vulnerability on the x-axis, the status of the system as the black dot, two different tipping points as vertical lines left and right of the yellow region, the fragile region in red past the tipping points, the resilient region in green to the left of the tipping points, and the distance between the tipping point (leftmost) and the status as the resilience buffer (e.g., as shown in FIG. 8D). It allows a user to tell at a glance whether the system is fragile or resilient, the relative role of the structural vulnerability as opposed to the fractal dimension in this resilience, and the distance (or buffer, or resilience reserve) from the status of the system to the tipping point.

The recovery time curve visualization in FIG. 10A compares the percentage of failures, the percentage recovered, and the elapsed time since the cascading failure occurred, representing the range of recovery possibilities experienced in the network. FIG. 10B also shows the optimal recovery sequence for the network given available recovery assets and the specific pattern of failures. An indicator line 1002 shows the typical recovery time for a system with the current status, in this case a mean recovery time.

Figure 11:
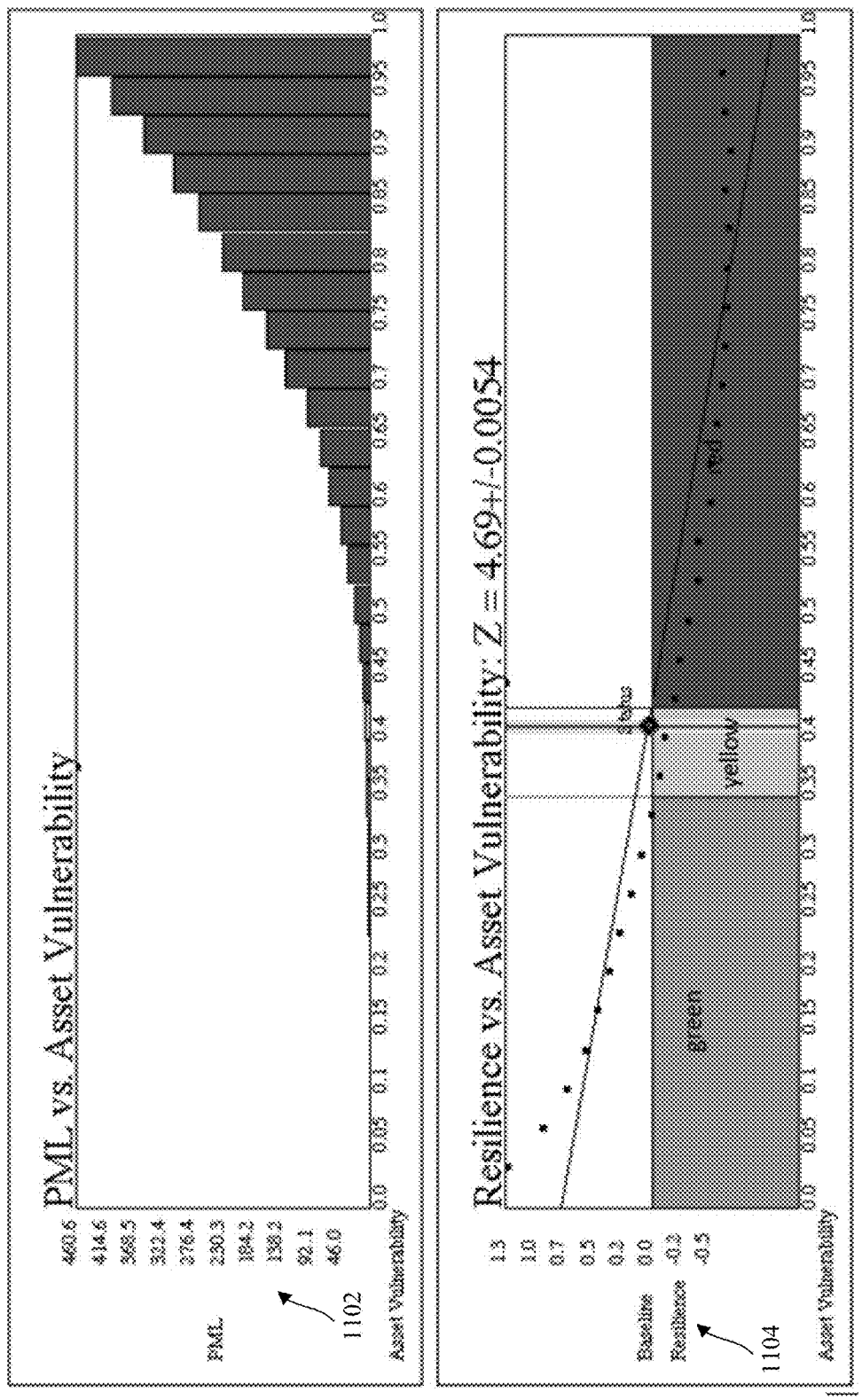
FIG. 11 shows graphs indicating asset vulnerability and corresponding MPL and baseline resilience, based on the principles disclosed herein.

FIG. 11 shows graphs 1102, 1104 indicating asset vulnerability and corresponding MPL and baseline resilience, based on the principles disclosed herein. The resilient system status, as shown in the graphs 1102, 1104, directly drives real-world risk and consequence, and a side-by-side comparison of the Risk, Structural Vulnerability, Resilience Score, and Tipping Point makes this plain. Paired together, the relationship between resilience (graph 1104) and risk (graph 1102) is synthesized visually and made plain to the user. Generally, a network with a status in the green resilience zone is unlikely to experience the severely consequential cascading failures that drive most of the risk, and hence MPL risk is small to the left of the tipping point.

In one or more related embodiments, a computer-automated method for establishing a minimum resilience threshold or tipping point that separates fragile networks (or set of multiple functionally distinct interconnected networks) that are inherently vulnerable to cascading failure from networks that are inherently resilient to cascading failure is provided.

The structural resilience metric and its score is novel in its precise mathematical formulation linking the network's spectral radius, risk, and vulnerability—but just as novel is the capability of the embodiments to identify a precise quantitative resilience threshold separating resilient system states from fragile system states that are prone to suffer highly consequential cascading failure, and to compare the network's current and hypothetical alternative status' with that tipping point. This embodiment is explained in FIG. 5 and further illustrated in FIGS. 10A-10B and FIGS. 12A-12C. The embodiments disclosed herein estimate many alternative system statuses computationally given a topology, fit a line to the empirically computed relationship to estimate the resilience score or fractal dimension, and solve for two different tipping points based where the fitted line intersects a resilience score of zero or the empirical status points first fall below zero. The tipping point is then compared with the network status to determine whether the network is resilient or fragile with respect to cascading failure. This single determination is an important factor for designing a network that does not suffer catastrophic cascading failures, in preventing those failures, and in certifying whether a network is fragile. Achieving a resilient network status that is to the left of the tipping point with a structural resilience score of five or greater may be both necessary and sufficient to mitigate most of the risk posed by cascading failures in networks. This determination may hold for all kinds of networks, including interconnected and interdependent systems of multiple networks.

In one or more related embodiments, a computer-automated method is provided for rapidly and, during the recovery emergency, recommending a component recovery order for a set of multiple and functionally distinct interconnected networks that have experienced a specific cascading failure, such that the cost and consequence of that specific failure is minimized.

Illustrated in FIG. 10B and explained as a prioritization method, recovery order is an important operational decision that may affect the risk and consequence and recovery resilience of a network, especially a network suffering cascading failure. The disclosed principles provide a rapid solution for this problem to enable system operators to dispatch recovery crews efficiently, e.g., using two different techniques. First, the system precomputes the ideal recovery order for most of the likely cascading failures during its initial analysis of the network, and this database of recovery orders can be provided to an operator before a cascading failure so that the best recovery order can be quickly "looked up" during the emergency. Second, the system is capable of accepting input from a digital twin or system model that represents an actual failure, and can compute the exact optimal recovery order in real time if that input data and sufficient computing power are available.

In one or more related embodiments, a computer-automated method for estimating the component recovery order that will minimize the typical consequence and recovery time given all possible cascading failures in a set of multiple and functionally distinct interconnected networks is provided.

If the recovery operator is not able to access a precomputed database of the recovery order recommended for most common cascading failures, and is not able to provide realtime failure data or access a realtime computation of the optimal recovery order, the next best option is for the recovery operator to have access to the single best or "typical" recovery order for the network. The disclosed method for providing this typical recovery order is to compute the average recovery rank order or sequence order of all components across all cascading failures that were simulated, and to provide this "typical" sequence to the operator before the failure occurs. This typical sequence is not strictly optimal but provides approximate guidelines for what components to typically recover first in a cascading failure.

In one or more related embodiments, one or more methods are integrated with a software digital twin to allow changes in the network's operation or design, along with any failures in the network, to be rapidly and efficiently incorporated into risk and resilience calculations and priorities.

A software digital twin includes a representation of the network topology along with an estimated or sensed representation of the network's current operational state, including especially component failures. Given sufficient computing power, the disclosed principles can be implemented in connection with a digital twin of the network to provide the capability to rapidly recompute resilience results when the network changes or experiences failures. This function is particularly important during failure events when the operators of the network might want to obtain a precise recovery order and recovery time calculation for the specific failure the network has experienced.

To illustrate the usefulness and capability of disclosed principles, they have been applied as discussed below to minimal network information about six infrastructure systems—the Western Electricity Coordinating Council (WECC) power grid, the South East Pennsylvania Transportation Authority commuter rail system (SEPTA), and the 2004 AS-level Internet, an Anonymous Water Distribution System, an Anonymous Water Distribution SCADA System, and an Anonymous Telecommunications Network "Alpha".

The WECC power grid extends from Utah, Colorado, New Mexico, and Arizona, to Oregon, Washington, Idaho, and California. It includes the largest nuclear power plant in the US and the largest hydroelectric power facility. It provides over 160,000 of the roughly 800,000 MW peak power available in the United States. The WECC information described here is from published routes and connections and focuses on high voltage transmission (not distribution lines). NATIONAL ELECTRIC TRANSMISSION CONGESTION STUDY, US Department of Energy, August 2006, pp. 32.

WECC's 181 substations and power plants and 235 high voltage transmission lines are portrayed as the nodes and links in the process network for purposes of characterizing WECC resilience. The method takes as inputs TVCE (Threat, Vulnerability, Consequence, Elimination Cost) values for each node and link. Assuming the user enters a given budget, the computer-automated method performs a static risk optimization to reduce vulnerability V by assuming it can be "bought down" according to an exponential diminishing returns equation. The results assume minimal level inputs, where TVCE are the same for all nodes and links, and cascading is simulated for $v=v_0/2$ for every node. These inputs are entered via the process shown in FIG. 7 and outputs obtained via the process shown in FIG. 8 which gives results for WECC.

Spectral radius and eigenvalues are calculated by the process in FIG. 3; resilience parameters and tipping point vulnerability $v_0$ are calculated by the process shown in FIG. 4; bottlenecks and blocking node set B are calculated by the process shown in FIG. 5. Blocking nodes correlate very heavily with risk and resilience in WECC. Correlation with node connectivity is 0.86 over all nodes and 0.89 over blocking nodes only. This high correlation between "cause-and-effect" means highly connected nodes contribute more to cascading than less connected nodes, and that blocking nodes are even more highly correlated with cascading. This result may guide a cost-conscious operator to focus limited resources on blocking nodes.

Using the disclosed principles, all transportation systems can be analyzed as networks to determine their resilience and to specify their critical factors, including rail, air routes and airports, road networks, shipping lanes, and supply chains. For example, SEPTA is a commuter rail system surrounding Philadelphia consisting of 80 stations and 90 routes. The process calculates spectral radius, influence (eigenvalues), resilience, tipping point vulnerability $v_0$, bottlenecks, and blocking sets B and L. The computer-automated method identifies 33 blocking nodes the failure of which would segment the system into islands. These stations and the rails leading into them are essential to continuity of operations. Like WECC, SEPTA is most prone to cascading when a node with high connectivity fails. A correlation of 0.81 over all nodes and 0.93 over blocking nodes suggests that the blocking nodes are the most critical of all. In addition to the above, a cascade analysis may be performed.

Figure 12A:
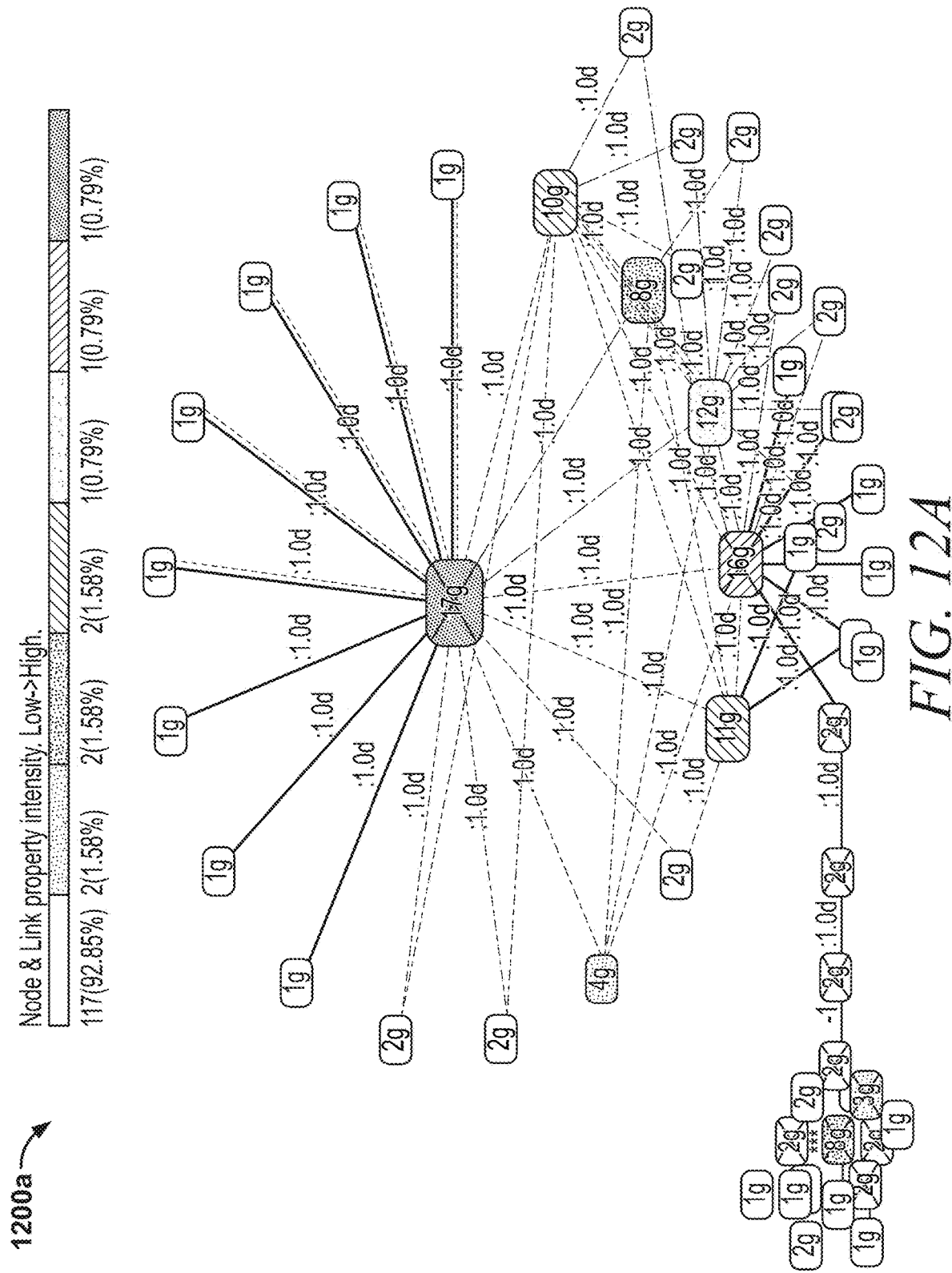
FIG. 12A shows an illustrative telecommunications network, to which the disclosed principles may be applied.
Figure 12B:
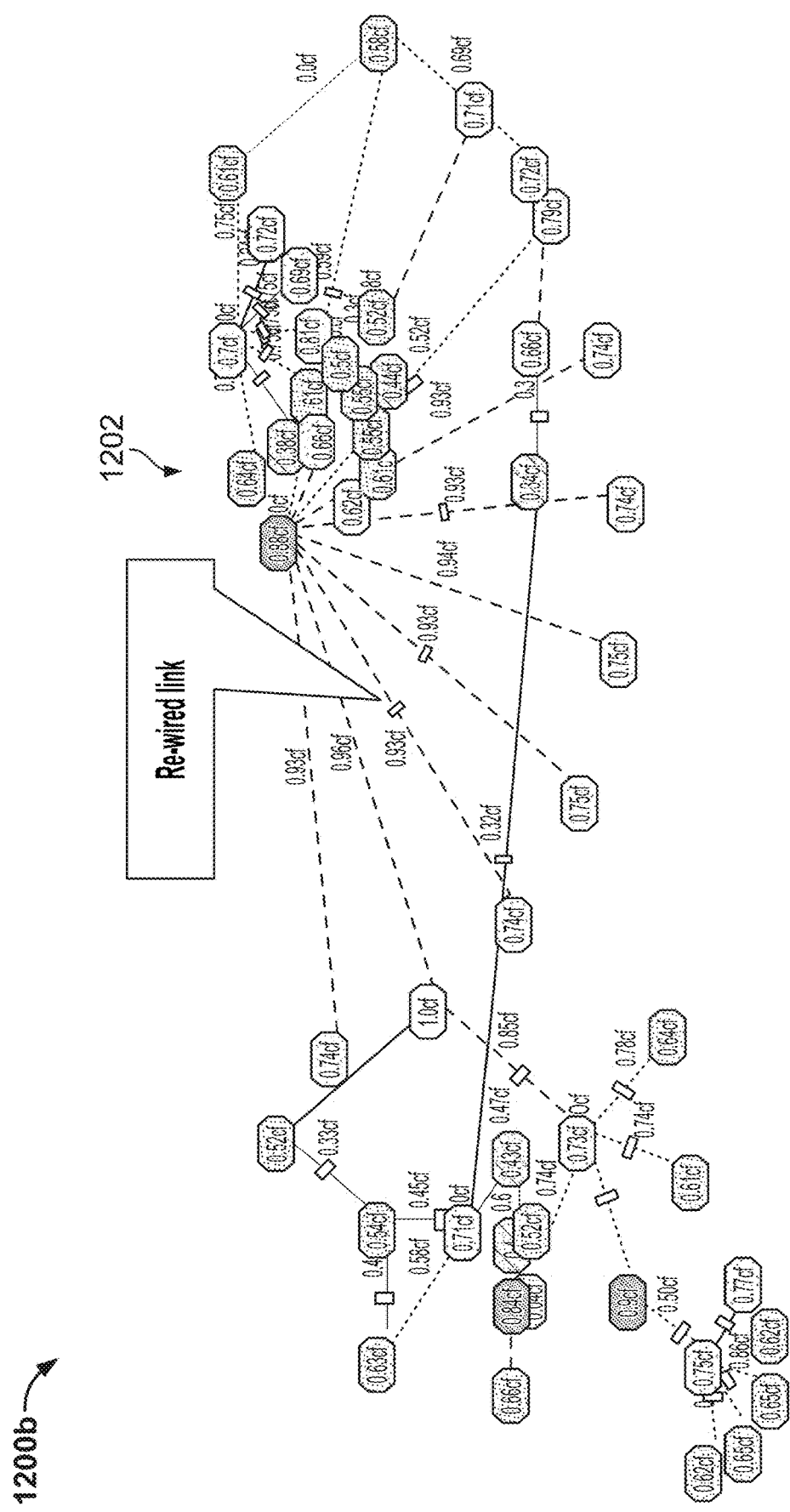
FIG. 12B shows the telecommunication network after a link has been rewired based on the principles disclosed herein.
Figure 12C:
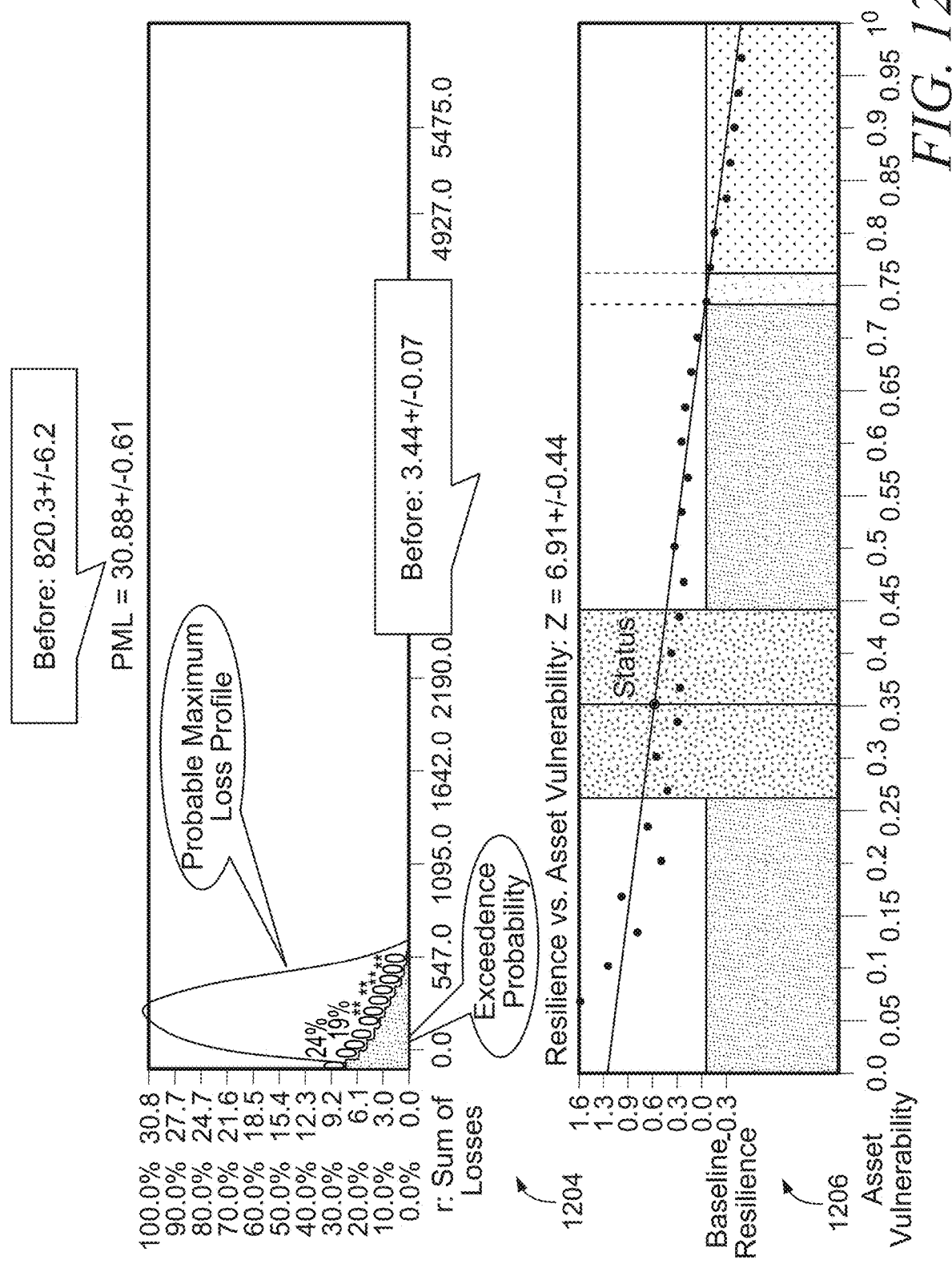
FIG. 12C shows graphs illustrating the effect of rewiring based on the principles disclosed herein.

Telecommunications networks are used in many applications, including in this "Alpha" case a multi-facility industrial control and communications network. For instance, FIG. 12A shows an illustrative telecommunications network 1200*a*, to which the disclosed principles may be applied. Particularly, FIG. 12A shows the telecommunications network 1200*a* before a rewiring process. FIG. 12B shows the telecommunication network 1200*b* after a link 1202 has been rewired based on the principles disclosed herein. The rewiring is based on mitigation analysis using the cascade frequency criticality factor to detect the component with the highest cascade frequency for reducing its criticality. FIG. 12C shows graphs 1204, 1206 illustrating the effect of rewiring based on the principles disclosed herein. Rewiring the single link 1202 (shown in FIG. 12B) reduces the network's criticality reduces the network's MPL Risk over 95% (shown in chart 1204) and improves the Score for Structural Resilience from 3.44 (fragile) to 6.91 (resilient) (shown in chart 1206), with 5 being resilient and therefore resistant to cascading failures.

Figure 13:
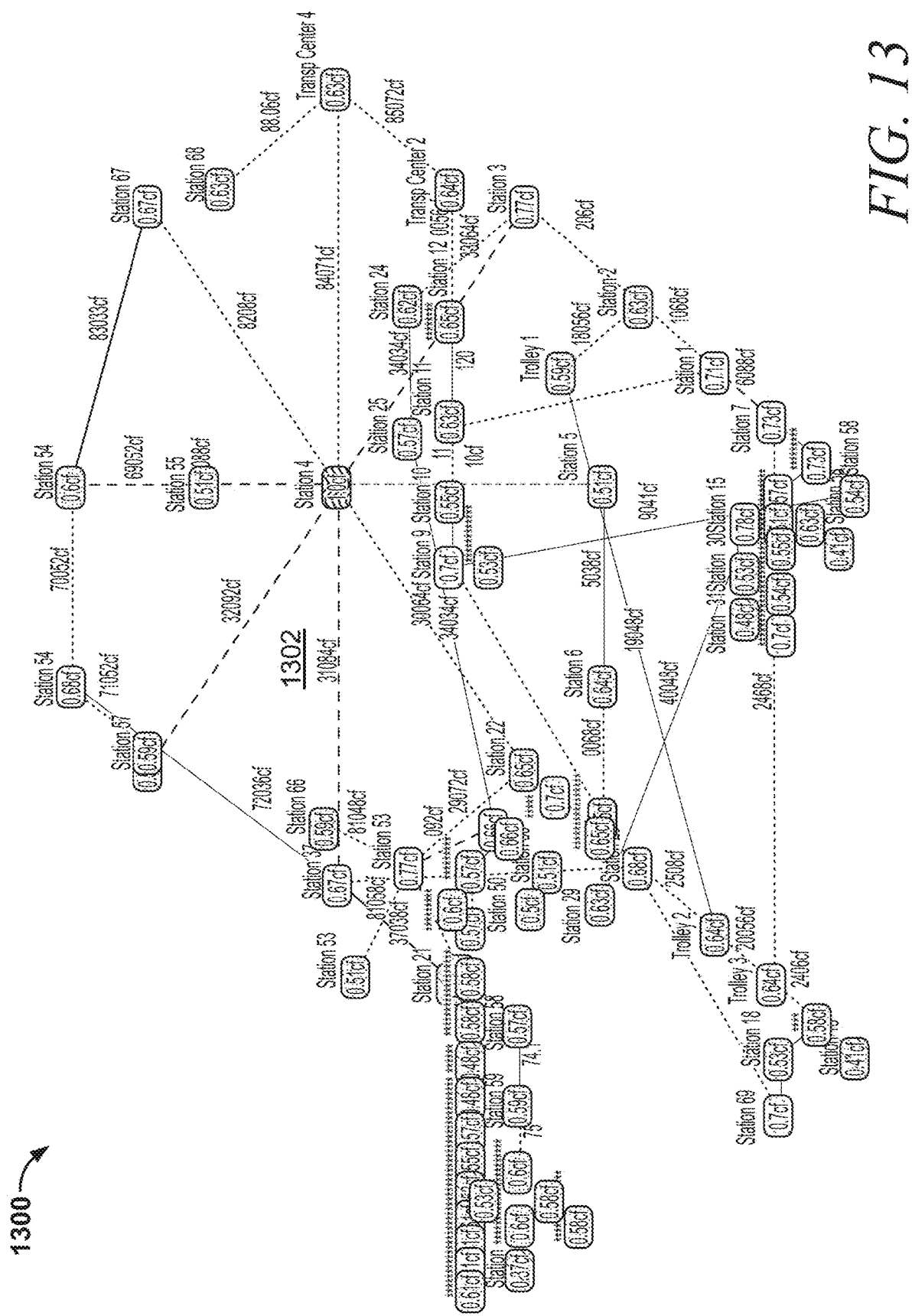
FIG. 13 shows a network illustrating a cascade analysis based on the principles disclosed herein.

FIG. 13 shows a network 1300 illustrating a cascade analysis based on the principles disclosed herein. Particularly, the cascade analysis—identifies "cascading corridors" 1302 using the cascade frequency criticality factor that city planners should be aware of, because they contribute the most to likely backups and traffic jams during peak commuter travel times. They are also the most critical paths through the network. As illustrated in FIG. 11, MPL Risk increases exponentially with the system's effective vulnerability and especially past the yellow tipping point where SEPTA becomes extremely fragile, at the same time that resilience decreases with effective vulnerability following a system status line. The yellow zone in the fundamental resilience chart indicates a phase transition (from mild to extreme fragility). The red zone indicates catastrophic failure, with a correspondingly high recovery cost in resources and time to recover.

In the Autonomous System (AS)-level internet nodes are autonomous systems and links are peering relationships (transmission cable or wireless). Autonomous systems are major tier-1 switches located around the globe that make up the "backbone" of the internet. They are numbered from 0 to 4,294,967,295, and represent administrative control over one or many servers. The AS-level Internet as it existed in 2004 is a network of AS-level "macro" granularity containing 13,527 nodes and 37,448 links. Spectral radius and influence are calculated by the process in FIG. 3; resilience parameters and tipping point vulnerability $v_0$ are calculated by the process shown in FIG. 4; and bottleneck and blocking node set B are calculated by the process shown in FIG. 4. Using these methods, 944 critical blocking nodes are identified—nodes that are the most important in terms of blocking the spread of malware, with a cascading failure correlation of 0.96 for blocking nodes. The Internet in 2004 had an extremely high spectral radius of 73.6, suggesting enormous hubs with large influence and connectivity. The hub of AS13527, for example, has 2637 connections.

While specific vulnerabilities of the Internet depend on applications running on the Internet infrastructure, the disclosed principles can identify the criticality of switches to the spread of malware once the network is "infected" regardless of the type of attack or malware used to exploit the internet. The full 2016 AS-level Internet is too large to be analyzed on a single computer, but it can be analyzed using hundreds of cores on a cloud-computing platform.

Figure 14A:
FIG. 14A shows a water distribution system to which the disclosed principles can be applied.

FIG. 14A shows a water distribution system 1400a to which the disclosed principles can be applied. The water distribution system 1400a may include the Anonymous Water Distribution system. The Anonymous Water Distribution system is a model water distribution network because the public authorities share the network topology and flow information. This network comprises reservoirs, pumps, pipes, and water treatment facilities. A large number of small water mains draw flow from a small number of larger mains.

Figure 14B:
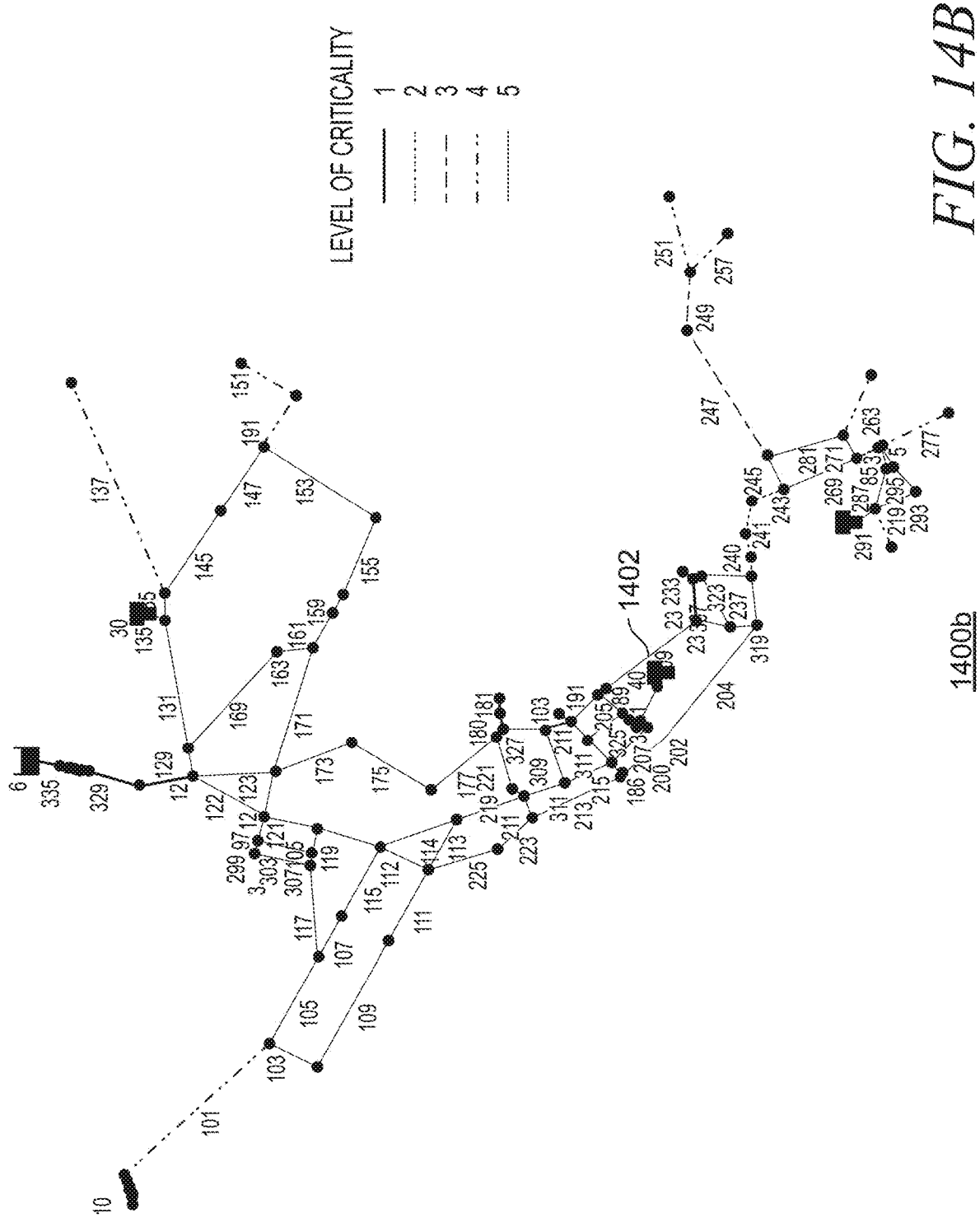
FIG. 14B shows a skeletonized version of the Anonymous Water Distribution system based on the principles disclosed herein.

FIG. 14B shows a skeletonized version 1400b of the Anonymous Water Distribution system based on the principles disclosed herein. The skeletonization may reduce computational requirements by considering only larger and more central system components. The bottlenecks are calculated using the process in FIG. 6. Some components—mostly large transmission pipes 1402—are major bottlenecks and blocking components that can cut off flow between subnetworks, and are the highest priority for mitigation. Mitigation in this case could include, for example, upgrading the pipes to protect them from failure, or the installation of redundant pipes. In the Anonymous Water Distribution system, the major pipe structures are skeletonized removing most nodes and links to reduce computational cost and analysis complexity without significantly compromising the quality of the resulting analysis.

Figure 15:
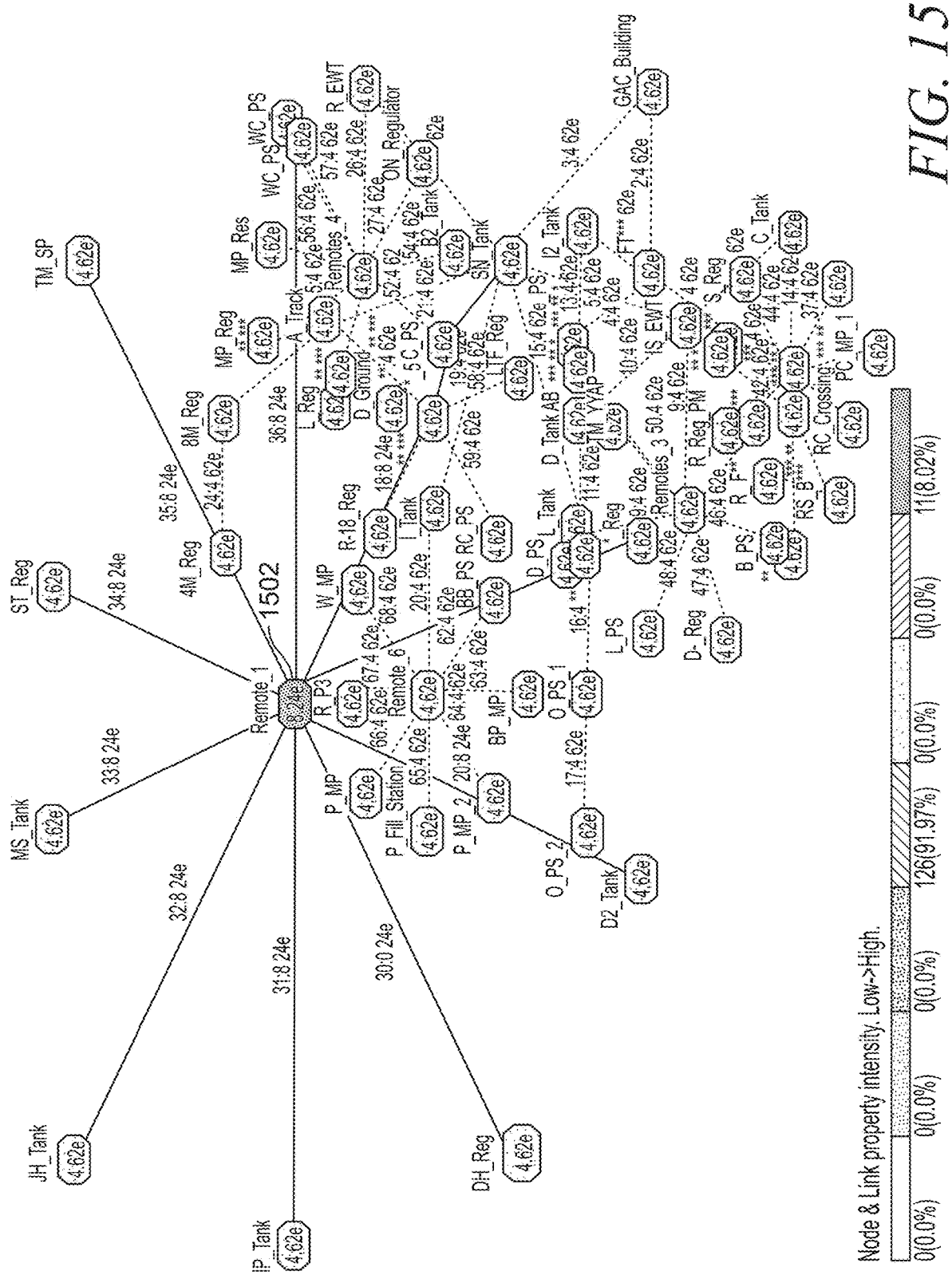
FIG. 15 illustrates shows an illustrative supervisory control and data acquisition (SCADA) system, to which the disclosed principles may be applied.

FIG. 15 shows an illustrative supervisory control and data acquisition (SCADA) system 1500, to which the disclosed principles may be applied. SCADA system is a telecommunications and controls system common in industry; and FIG. 15 shows a SCADA system 1500 for a water distribution system in the United States. Generally, SCADA systems often have a hub-centric structure with one or two central hubs that are highly critical for the system's resilience. In the shown SCADA system 1500, a single control hub 1502 is critical because it has a high spectral radius (influence) and therefore is a conduit for cascading failures—such as faulty signals, computer viruses, cybersecurity breaches, or communications failures. This critical hub 1502 it to be made less critical by splitting it into multiple distributed and redundant control hubs and/or by more thoroughly protecting it from failure.

Some novel aspects of the principles disclosed herein are discussed below.

One point of novelty disclosed herein is the capability to quantify resilience and risk for all kinds of interconnected networks without exception, and without the excessive complication and expense required by detailed physical modeling of each network and of their joint function, even when the interconnected networks are of qualitatively different types; this is a problem where existing systems struggle to quantify the interdependent vulnerabilities involved in interconnections. The disclosed principles are usable to support network design and planning and operations, and to support emergency response planning and post-incident response. Because the disclosed principles associate resilience metrics and mitigation options with return on resilience investment it is also usable for pricing, regulatory, investor, and insurance purposes. The disclosed principles adapt and modify advances in the fields of complex adaptive systems theory, network science, computer simulation and stress testing, infrastructure engineering and risk science and statistics.

In a first embodiment there is provided a computer-automated system for efficiently and practically determining, prioritizing and presenting ameliorative mitigation interventions in a network's risk and resilience with respect to cascading failures, comprising: using a database that imports and exports data files containing an approximate representation of a network's essential topological (e.g. node-network, flow direction), functional (e.g., flow, connectivity, recovery time, recovery order, vulnerability, cascade probability), and economic (e.g., failure consequence, recovery cost, mitigation cost) attributes; estimating unknown network attributes to achieve a qualitatively robust solution where complete data is unavailable; efficiently estimating the risk, resilience, and fragility associated with all-hazard, random, or threat-specific originated cascading failure for any network, both for the baseline network and also for the same network with a set of mitigation interventions applied, to identify and prioritize interventions based on their efficacy on both a risk and resilience basis, and also a cost-effectiveness basis, relying on minimal network attributes and requiring no foreknowledge of the threat scenario rather than requiring extensively detailed engineering and operations models of the system and/or accurate characterization and prediction of the specific threat scenario causing the failure; efficiently implementing the methods on a sufficiently powerful high performance or parallel computer in order to solve real-world interconnected network sizes and scenarios comprising many nodes and links, many interconnected networks, and many combinations of mitigation interventions; and providing a user interface and visual representation of results that reduces complicated and voluminous results to simple maps and visualizations that variously communicate to both technically expert and general audiences in executive, investor, insurance, regulatory, and policy roles the overall risk and resilience and fragility of the network's status with respect to cascading failure, the most critical network components, and the highest-priority mitigation interventions based on both efficacy and cost-effectiveness.

In another embodiment, a computer-automated method for estimating the importance of each node and link collected in the network database with respect to the network's risk of financial or other loss due to cascading failure is provided. The method comprises: calculating key risk metrics and key criticality factors, using a database describing the network attributes collected in the database, to measure each network component's importance in determining the network's risk, resilience, and fragility with respect to cascading failure; using computer automated stress tests for all kinds of networks to propagate failure in one component to other components in cascading fashion via a probabilistic failure-contagion mechanism; for flow networks, using computer automated stress tests to propagate failure in one component to other components via the mechanism flow overloading of components remaining after failure; for all networks and all possible cascading failures, calculating a distribution for the recovery time and recovery cost, and identifying the optimal component recovery order, given a defined set of recovery assets and defined set of recovery attributes for system components (e.g. recovery time and cost for each component); for all kinds of networks, estimating the relative probability that failure in one component cascades to other components based on criticality factors, where adequate data for these cascade probabilities is unavailable; using a computer automated stress test to estimate the importance of each component in the network for propagating cascading failures of any origin, whether random, all-hazard, or threat-specific; and implementing the method on a high-performance computer including parallel and cloud computing functions that are needed to solve the method for realistically sized networks.

In another embodiment, there is provided a computer-automated method for estimating missing network attributes (e.g., component vulnerability, failure probability, and cascade or contagion cascade propagation and loss probability) solely based on criticality factors derived from basic network statistics that apply equally to all kinds of networks.

In a further embodiment, there is provided a computer-automated method for effectively prioritizing mitigation interventions and investments to reduce the network's total risk or consequence posed by cascading failure, based on relative efficacy and/or net cost effectiveness, comprising: describing a network's topology using quantified attributes of its node and link components; quantifying network component vulnerability to both targeted threat-specific and/or random and/or all-hazard failures; quantifying the probability of a failure in each component cascading to other components using a probabilistic cascading failure mechanism that works for all kinds of networks; quantifying the probability of a failure in each component cascading to other components using a flow overloading failure mechanism that works for flow networks; quantifying a probability distribution of the risk or consequence based on all possible cascading failures originating in random, all-hazards, and/or threat-specific causes; describing the availability and efficacy of network recovery assets for repairing network components; establishing the optimal order for recovery of network components given available recovery assets to minimize the risk and consequence of cascading failures; quantifying the cost of recovery in money and time; quantifying the cost of mitigation intervention to improve each network attribute on a component-by-component basis; identifying components that are most likely to propagate cascading failures and which therefore most increase system risk and consequence of cascading failure; and identifying and ranking the most relatively effective and most cost-effective mitigation interventions to reduce the risk and consequence of cascading failure.

In another embodiment, there is provided a computer-automated method of comparing multiple sets of mitigation interventions to satisfy multiple risk and resilience objectives, comprising: identifying one or more sets of mitigation interventions that achieve a designed tradeoff between multiple objectives, including minimizing risk and consequence of all kinds of cascading failures, maximizing resilience, minimizing recovery time and cost, and achieving a network resilience status exceeding a minimum value necessary to avoid fragility; identifying one or more sets of mitigation interventions necessary to minimally satisfy risk and resilience performance benchmarks established by the network operator or a standards body; identifying the most effective set of mitigation interventions, lowest level of risk and consequence, and highest level of resilience possible for a given mitigation budget; and identifying a minimum budget or scope for mitigation interventions to achieve a minimum risk and resilience performance benchmark.

In a further embodiment, there is provided a computer-automated method for visually communicating the network's overall risk and consequence with respect to cascading failure, comprising: presenting a simple visual representation of a network's overall risk and resilience in relation to cascading failure or contagion in its baseline status and alternative status' after events or sets of mitigation interventions occur; employing color coded network component maps with color coding based on criticality factors used to visually identify the most important components in the network with respect to their effect on cascading failure risk and consequence; presenting a visual indication of minimum risk and resilience performance benchmarks (or standards), specifically including visual indication of a tipping point separating a resilient from a fragile network status in comparison with the network's actual status; presenting a visual indication of buffers or factors of safety separating the network status from a minimum performance benchmark; presenting a simple color or symbol schemes to visually indicate the status of the network with respect to performance standards; presenting visualization of the relationship of mitigation interventions to the marginal improvement in the network's status, risk, and/or consequence; using digital twin to illustrate the importance of specific components for cascading failure or mitigation overlaid on a visual representation of the network's structure and function; reducing the above results to a simple set of numbers or symbols representing the network's status with respect to performance standards; and presenting variants of the visual indication for specific classes of networks.

In yet another embodiment, a computer-automated method for establishing a minimum resilience threshold or tipping point that separates fragile networks (or set of multiple functionally distinct interconnected networks) that are inherently vulnerable to cascading failure from networks that are inherently resilient to cascading failure is provided. The method comprises: providing a scale for structural resilience, which establishes the baseline network status and many alternative network status' on axes comparing the network's resilience score with its effective vulnerability, with multiple methods used to establish confidence in the location of the status; providing a tipping point which separates resilience scores above zero from those below zero (or, resilient from fragile networks), with multiple methods used to establish confidence in the location of the tipping point; providing a resilience reserve which is a factor of safety separating the network's status from the tipping point; this is a type of resilience buffer which allows network vulnerability to be exploited without creating risk of highly consequential cascading failure; and using the tipping point and resilience reserve to define a robust, quantitative, and objectively defined minimum acceptable level of resilience for any kind of network.

In another embodiment, there is provided a computer-automated method for rapidly and during the recovery emergency recommending a component recovery order for a set of multiple and functionally distinct interconnected networks that have experienced a specific cascading failure, such that the cost and consequence of that specific failure is minimized, comprising: using a digital twin of the network to identify the current state of function or failure of all components of the set of networks along with the status of available recovery assets; computing the best possible recovery cost, consequence, and recovery time for the set of networks given available recovery assets, using high performance and cloud computing resources capable of giving these answers quickly enough to provide recommendations during an emergency recovery situation; providing of prioritized lists, one list for each recovery asset, of the components that should be recovered first and in what order by that specific recovery asset; and providing a single master recovery order list establishing which components should be recovered first and in what order by the full team of recovery assets.

In another embodiment, there is provided a computer-automated method for estimating the component recovery order that will minimize the typical consequence and recovery time given all possible cascading failures in a set of multiple and functionally distinct interconnected networks, comprising: identifying the highest-consequence network blocking components that must be recovered to re-establish system connectivity; calculating network components that most frequently participate in cascading failures of high consequence; and providing a single master prioritized component recovery order list that minimizes the recovery cost, consequence, and recovery time of the typical cascading failure.

In another embodiment, the system or method is integrated with a software digital twin or similar planning and operations computing platform to allow changes in the network's operation or design, along with any failures in the network, to be rapidly and efficiently incorporated into risk and resilience calculations and priorities.

In yet another related embodiment, the system of method includes the skeletonization or reduction of the network topology to capture its essential criticality features as indicated by the criticality factors without significantly compromising the accuracy of the analysis and for the purpose of achieving rapid and low-cost computation of the network resilience results.

In an embodiment, a system is provided. The system may include a non-transitory storage medium storing computer program instructions and a plurality of parallel processors configured to execute the computer program instructions. The plurality of parallel processors execute the computer program instructions to cause the system to perform operations comprising quantifying a plurality of component level risks for at least a subset of components in a network; simulating cascades of the component level risks, with each corresponding component designated as a risk seed of the subset of components throughout the network; and quantifying the network level risk as a risk status in a resilience spectrum based on the simulated cascades.

Additional examples of the presently described method and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system comprising:
    a non-transitory storage medium storing computer program instructions; and
    one or more processors configured to execute the computer program instructions to cause the system to perform operations comprising:
        quantifying a plurality of component level risks for at least a subset of components in a network;
        simulating cascades of the component level risks, with each corresponding component designated as a risk seed of the subset of components, throughout the network;
        quantifying a network level risk as a risk status in a resilience spectrum based on the simulated cascades by:
            fitting a least-squares line to the component level risks and a fractal dimension based on corresponding exceedance probabilities derived from the simulated cascades to generate at least two risk parameters;
            calculating, based on the generated at least two risk parameters, a tipping point within the resilience spectrum, wherein first portion of the spectrum at one side of the tipping point indicates that the network is resilient to cascading failures, and wherein a second portion of the spectrum at the other side of the tipping point indicates that the network is non-resilient to cascading failures; and calculating a resilience reserve as a factor of safety between the risk status and the tipping point; and displaying the risk status, the resilience reserve, and the tipping point within the resilience spectrum on a graphical user interface, such that the displayed information may be used to mitigate the network level risk.

2. The system of claim 1, the subset of component comprising a plurality of network nodes and a plurality of network links.

3. The system of claim 1, the network comprising at least one of water distribution network, pump driven stormwater and wastewater network, electrical power distribution network, electrical transmission network, supervisory control and data acquisition (SCADA) system, telecommunication network, transportation network, computer network, building structure, socio-technical network, supply chain network, internet of things (IoT) network, or human managerial network.

4. The system of claim 1,
the network simulating cascades of component level risks comprising simulating the cascades throughout the network, the network being interdependent; and
quantifying the network level risk comprising quantifying the interdependent network level risk.

5. The system of claim 1, quantifying the network level risk further comprising:
determining a spectral radius of the network, wherein the spectral radius comprises the largest eigenvalue of a connection matrix representing the network.

6. The system of claim 1, quantifying the network level risk further comprising:
calculating a network failure probability based on a component level risk.

7. The system of claim 1, quantifying the network level risk further comprising:
calculating a corresponding exceedance probability indicating that a loss exceeds a predetermined value based on a component level risk.

8. The system of claim 1, quantifying the network level risk comprising:
calculating a maximum probable loss based on a component level risk.

9. The system of claim 1, the subset of components comprising a plurality of network nodes, and quantifying the network level risk comprising:
generating a list of blocking network nodes from the plurality of network nodes.

10. The system of claim 1, the subset of components comprising a plurality of network links, and quantifying the network level risk comprising:
generating a list of blocking network links from the plurality of network links.

11. The system of claim 1, quantifying the network level risk comprises:
calculating a cost for mitigating the network level risk.

12. The system of claim 1, the operations further comprising:
determining a mitigation measure to reduce the network level risk.

13. The system of claim 12, the subset of components comprising a plurality of network links, and the mitigation measure comprising rewiring of at least one of the plurality of network links.

14. The system of claim 12, the subset of components comprising a plurality of network nodes, and the mitigation measure comprising at least one of:
splitting at least one network node of the plurality of network nodes; or
combining at least two network nodes of the plurality of network nodes.

15. The system of claim 12, the mitigation measure comprising:
reducing vulnerability of at least one component of the subset of components.

16. The system of claim 12, the mitigation measure comprising:
reducing a consequence of at least one component of the subset of components.

17. The system of claim 12, the mitigation measure comprising:
improving at least one of a recovery cost, recovery time, or recovery order.

18. A non-transitory storage medium storing computer program instructions, which when executed cause operations comprising:
quantifying a plurality of component level risks for at least a subset of components in a network;
simulating cascades of the component level risks, with each corresponding component designated as a risk seed of the subset of components, throughout the network;
quantifying a network level risk as a risk status in a resilience spectrum based on the simulated cascades by:
fitting a least-squares line to the component level risks and a fractal dimension based on corresponding exceedance probabilities derived from the simulated cascades to generate at least two risk parameters;
calculating, based on the generated at least two risk parameters, a tipping point within the resilience spectrum, wherein first portion of the spectrum at one side of the tipping point indicates that the network is resilient to cascading failures, and wherein a second portion of the spectrum at the other side of the tipping point indicates that the network is non-resilient to cascading failures; and
calculating a resilience reserve as a factor of safety between the risk status and the tipping point; and
displaying the risk status, the resilience reserve, and the tipping point within the resilience spectrum on a graphical user interface, such that the displayed information may be used to mitigate the network level risk.

19. The non-transitory storage medium of claim 18, the subset of component comprising a plurality of network nodes and a plurality of network links.

20. The non-transitory storage medium of claim 18, the network comprising at least one of water distribution network, pump driven stormwater and wastewater network, electrical power distribution network, electrical transmission network, supervisory control and data acquisition (SCADA) system, telecommunication network, transportation network, computer network, building structure, socio-technical network, supply chain network, internet of things (IoT) network, or human managerial network.

* * * * *